United States Patent [19]

Sakakibara et al.

[11] Patent Number: 5,134,980
[45] Date of Patent: Aug. 4, 1992

[54] KNOCK GENERATION CONTROL SYSTEM FOR ENGINES

[75] Inventors: Koji Sakakibara, Hekinan; Hirohiko Yamada, Anjo, both of Japan

[73] Assignee: Nippondenso Co., Ltd., Kariya, Japan

[21] Appl. No.: 687,853

[22] PCT Filed: Oct. 2, 1990

[86] PCT No.: PCT/JP90/01267
§ 371 Date: Jul. 25, 1991
§ 102(e) Date: Jul. 25, 1991

[87] PCT Pub. No.: WO91/05160
PCT Pub. Date: Apr. 18, 1991

[30] Foreign Application Priority Data

Oct. 3, 1989 [JP] Japan ................................ 1-258521

[51] Int. Cl.$^5$ ............................................. F02P 5/14
[52] U.S. Cl. ..................................................... 123/425
[58] Field of Search .................... 123/425, 435; 73/35

[56] References Cited

U.S. PATENT DOCUMENTS

| | | | |
|---|---|---|---|
| 4,711,212 | 12/1987 | Haraguchi et al. | 123/425 |
| 4,967,710 | 11/1990 | Komurasaki et al. | 123/425 |
| 5,000,149 | 3/1991 | Miyama | 123/425 |
| 5,029,566 | 7/1991 | Komurasaki | 123/425 |

FOREIGN PATENT DOCUMENTS

| | | | |
|---|---|---|---|
| 60-243369 | 12/1985 | Japan . | |
| 62-126244 | 6/1987 | Japan | 123/425 |
| 62-267574 | 11/1987 | Japan . | |
| 62-294748 | 12/1987 | Japan | 123/425 |
| 63-253155 | 10/1988 | Japan . | |
| 63-253173 | 10/1988 | Japan . | |
| 63-268958 | 11/1988 | Japan . | |
| 63-295864 | 12/1988 | Japan | 123/425 |
| 64-12069 | 1/1989 | Japan . | |
| 1-315649 | 12/1989 | Japan . | |

Primary Examiner—Raymond A. Nelli
Attorney, Agent, or Firm—Cushman, Darby & Cushman

[57] ABSTRACT

A knock generation control system for engines has a knock sensor for detecting a knocking phenomenon occurring in an engine, a representative value detecting unit for detecting representative values V from output signals of the knock sensor which are effective for the detection of a knock, a standard deviation detecting unit for detecting a quantity SGM corresponding to a standard deviation of a frequency distribution of logarithmic conversion values IV of the representative values V, a cumulative percentage point detecting unit for detecting a value $V_P$ of a cumulative percentage point of the frequency distribution, a knock decision level setting unit for setting a knock decision level $V_{KD}$ in accordance with the detected quantity SGM and the detected value $V_P$, a knock detecting unit for detecting generation of a knock in accordance with the representative values V and the knock decision level $V_{KD}$, and an adjusting unit for adjusting a knock control factor which is used to control generation of a knock in accordance with an output signal of the knock detecting unit. Thus, the knock generation control system for engines sets a suitable knock decision level rapidly, makes it possible to make an accurate decision on the generation of a knock, and sets the knock decision level so that a constant knock decision frequency is obtained, thereby making it possible to provide a suitable ignition timing advance.

11 Claims, 14 Drawing Sheets

KNOCK GENERATION CONTROL SYSTEM FOR ENGINES

TECHNICAL FIELD

The present invention relates to a knock generation control system for engines for controlling a knock control factor (for example, ignition timing, air/fuel ratio, supercharging pressure or the like) by detecting a knock generated in an engine, and, more particularly, to a knock generation control system for engines including the setting of a knock decision level.

BACKGROUND ART

Generally, a knock decision level $V_{KD}$ is produced by multiplying a mean level of a knock sensor signal by a constant K. In such a KCS (knock control system), there is a problem that an optimum value of K changes due to manufacturing disperison, variations with time, etc. of engines, knock sensors and so on, which makes it difficult to perform accurate knock detection. In order to solve this problem, a system has been proposed which pays attention to the fact that, as shown in FIG. 15, the shape of a frequency distribution curve (broken line) of representative values of a knock sensor signal, in the case where a knock is generated, is distorted in the direction of a region of greater representative values of the knock sensor signal, in the case where a knock is generated, is distorted in the direction of a region of greater representative values of the knock sensor signal as compared with that of a frequency distribution curve (solid line) in the case where no knock is generated, and which contemplates to automatically correct a knock decision level on the basis of a degree of the distortion (for example, a relation in magnitude between the area of a region 1 and that of a region 2 in FIG. 15) (for example, see JP-A-62-267574).

However, when the region 1 or region 4 in FIG. 15 is used as a parameter for correcting the knock decision level as in the above system, a long time is required before a sufficient amount of data for correcting the knock decision level is obtained, since the probability for a representative value to fall within the region 1 or region 4 is small. Accordingly, there is a problem that a long time would elapse before the knock decision level is automatically corrected to have an adequate level and, as a result, inadequate knock detection is made during that time.

DISCLOSURE OF THE INVENTION

The present invention is made to solve the above-mentioned problem, and an object of the present invention is to provide a system which enables automatic correction of a knock decision level so as to make it have an adequate level within a short period of time.

FIG. 1 is a functional block diagram which comprehensively illustrates a functional relation between constituent elements of the system of the present invention.

In order to attain the above-mentioned object, the present invention proposes a knock generation control system for engines which comprises, as shown in FIG. 1:

a knock sensor for detecting a knocking phenomenon generated in an engine;

standard deviation detecting means for detecting a quantity SGM corresponding to a standard deviation of a frequency distribution of logarithmic conversion values IV of said representative values V;

cumulative percentage point detecting means for detecting a value $V_P$ of a cumulative percentage point of said frequency distribution;

knock decision level setting means having u-value calculating means for calculating a value of u, which becomes greater as the rotational speed of said engine increases, and setting a knock decision level $V_{KD}$ in accordance with said quantity SGM corresponding to the standard deviation, and said value $V_P$ of the cumulative deviation, and said value of u;

knock detecting means for detecting generation of a knock in accordance with said representative values V and said knock decision level $V_{KD}$ and producing a knock generation detection signal; and adjusting means responsive to said knock generation detection signal from said knock detecting means for adjusting a knock control factor which is used to suppress generation of a knock.

It should be noted that the value of the cumulative percentage point of the frequency distribution denotes a value which represents a position on the abscissa of a graph showing the cumulative percentage of the frequency of knock generation in the graphical representation of a frequency distribution curve.

In the knock generation control system for engines, the knock decision level setting means may comprise engine state detecting means for detecting an operating state of the engine, the knock decision level setting means setting a knock decision level $V_{KD}$ in accordance with the quantity SGM corresponding to the standard deviation, the value $V_P$ of the cumulative percentage point and the operating state of the engine so that the frequency of knock decision per unit time assumes a predetermined value.

The engine state detecting means may include speed detecting means for detecting a rotational speed Ne of the engine.

The logarithmic conversion means in this system may be constructed to produce the logarithmic conversion values IV of the representative values V in accordance with the relation $IV = A \times \log(V/a)$ (A, a: constants).

The logarithmic conversion means may comprise:

storing means in which the logarithmic conversion values IV of the representative values V are preliminarily stored; and reading means for reading the logarithmic conversion values IV of the representative values V from the storing means.

The knock decision level setting means may set the knock decision level $V_{KD}$ in accordance with the quantity SGM corresponding to the standard deviation and the value $V_P$ of the cumulative percentage point on the basis of the relation $V_{KD} = u \times SGM + V_P$ (u: a variable defined by the rotational speed Ne of the engine).

The knock decision level setting means may comprise u value setting means for setting a value of u to a larger value as a value representative of the rotational speed Ne of the engine becomes larger.

The knock decision level setting means may comprise knock decision level correcting means for correcting the knock decision level $V_{KD}$, which has been set in accordance with the rotational speed Ne of the engine, the quantity SGM corresponding to the standard deviation and the value $V_P$ of the cumulative percentage point, by using a predetermined value.

The standard deviation detecting means may comprise changing means for changing the quantity SGM corresponding to the standard deviation so as to satisfy at least one of a condition that a probability of satisfying the relation $(V_p - SGM) \leq IV \leq V_P$ with respect to the logarithmic conversion values IV of the representative values V and the value $V_P$ of the cumulative percentage point becomes ⅓ and a condition that a probability of satisfying the relation $(V_p - SGM) \leq IV \leq (V_p + SGM)$ becomes ⅔.

The standard deviation detecting means may comprise first detecting means for detecting that the engine is in a state in which a knock is easily generated, whereby the standard deviation detecting means performs detection of the quantity SGM corresponding to the standard deviation only when the first detecting means detects that the engine is in the state in which a knock is easily generated.

The standard deviation detecting means may comprise:

second detecting means for detecting that the engine is in a state in which a knock is hard to be generated;

upper limit value setting means for detecting, when the second detecting means detects that the engine is in the state in which a knock is hard to be generated, the quantity SGM corresponding to the standard deviation in that state and setting the detected quantity SGM corresponding to the standard deviation as an upper limit value for the standard deviation; and suppressing means for suppressing the upper limit value by using the quantity SGM corresponding to the standard deviation.

The adjusting means may comprise:

knock intensity decision level setting means for setting a knock intensity decision level $V_{KD'2}$ higher than the knock decision level $V_{KD}$ in accordance with the quantity SGM corresponding to the standard deviation and the value $V_P$ of the cumulative percentage point; and adjustment quantity setting means for setting an adjustment quantity for adjusting the knock control factor in accordance with the representative values V and the knock intensity decision level $V_{KD'2}$.

The value $V_P$ of the cumulative percentage point may be set to a cumulative percentage point of 50% (median value) $V_{MED}$.

The cumulative percentage point detecting means may comprise:

speed detecting means for detecting a rotational speed of the engine;

speed logarithmic conversion means for making logarithmic conversion of the rotational speed Ne of the engine detected by the speed detecting means; and cumulative percentage point correcting means for correcting the value $V_P$ of the cumulative percentage point in accordance with a logarithmically converted engine speed lNe.

The engine state detecting means may include at least one of the speed detecting means for detecting the rotational speed Ne of the engine; and load detecting means for detecting a load on the engine.

The cumulative percentage point detecting means may comprise:

mean value detecting means for detecting a mean value $V_{MALL}$ of the representative values V corresponding to each engine cylinder; and cumulative percentage point correcting means for correcting the value $V_P$ of the cumulative percentage point in accordance with the detected mean value $V_{MALL}$.

The standard deviation detecting means may comprise:

probability detecting means for detecting a probability of the representative values V to fall within a predetermined region of the frequency distribution; and standard deviation correcting means for correcting the quantity SGM corresponding to the standard deviation in accordance with the detected probability.

Further, in order to achieve the above-mentioned object, the present invention proposes a knock generation control system for engines comprising:

speed detecting means for detecting a rotational speed Ne of an engine;

a knock sensor for detecting a knocking phenomenon generated in the engine;

representative value detecting means for detecting representative values V from output signals of the knock sensor which are effective for the detection of a knock;

standard deviation detecting means for detecting a quantity SGM corresponding to a standard deviation of a frequency distribution of logarithmic conversion values IV of the representative values V;

cumulative percentage point detecting means for detecting a value $V_P$ of a cumulative percentage point of the frequency distribution;

knock decision level setting means for setting a knock decision level $V_{KD}$ in accordance with the detected rotational speed Ne of the engine, the quantity SGM corresponding to the standard deviation and the value $V_P$ of the cumulative percentage point so that a frequency of knock decision per unit time assumes a predetermined value;

knock detecting means for detecting generation of a knock in accordance with the representative values V and the knock decision level $V_{KD}$ and producing a knock generation detection signal; and adjusting means responsive to the knock generation detection signal from the knock detecting means for adjusting a knock control factor which is used to suppress generation of a knock.

In the system of the present invention having the construction mentioned above, a knocking phenomenon occurring in the engine is detected by the knock sensor. Representative values V of the knock sensor signal effective for the detection of a knock is detected by the representative value detecting means.

On the other hand, in the knock decision level setting means, a knock decision level $V_{KD}$ is set in accordance with a quantity SGM corresponding to a standard deviation detected by the standard deviation detecting means and a value $V_P$ of a cumulative percentage point detected by the cumulative percentage point detecting means.

The generation of a knock is detected by the knock detecting means in accordance with the representative values V and the knock decision level $V_{KD}$. Further, the adjusting means adjusts a knock control factor in accordance with a knock generation detection signal from the knock detecting means so as to suppress generation of a knock.

BEST MODE FOR CARRYING OUT THE INVENTION

A first embodiment to which the present invention has been applied will now be explained with reference to FIGS. 2 to 16.

Figure 2:
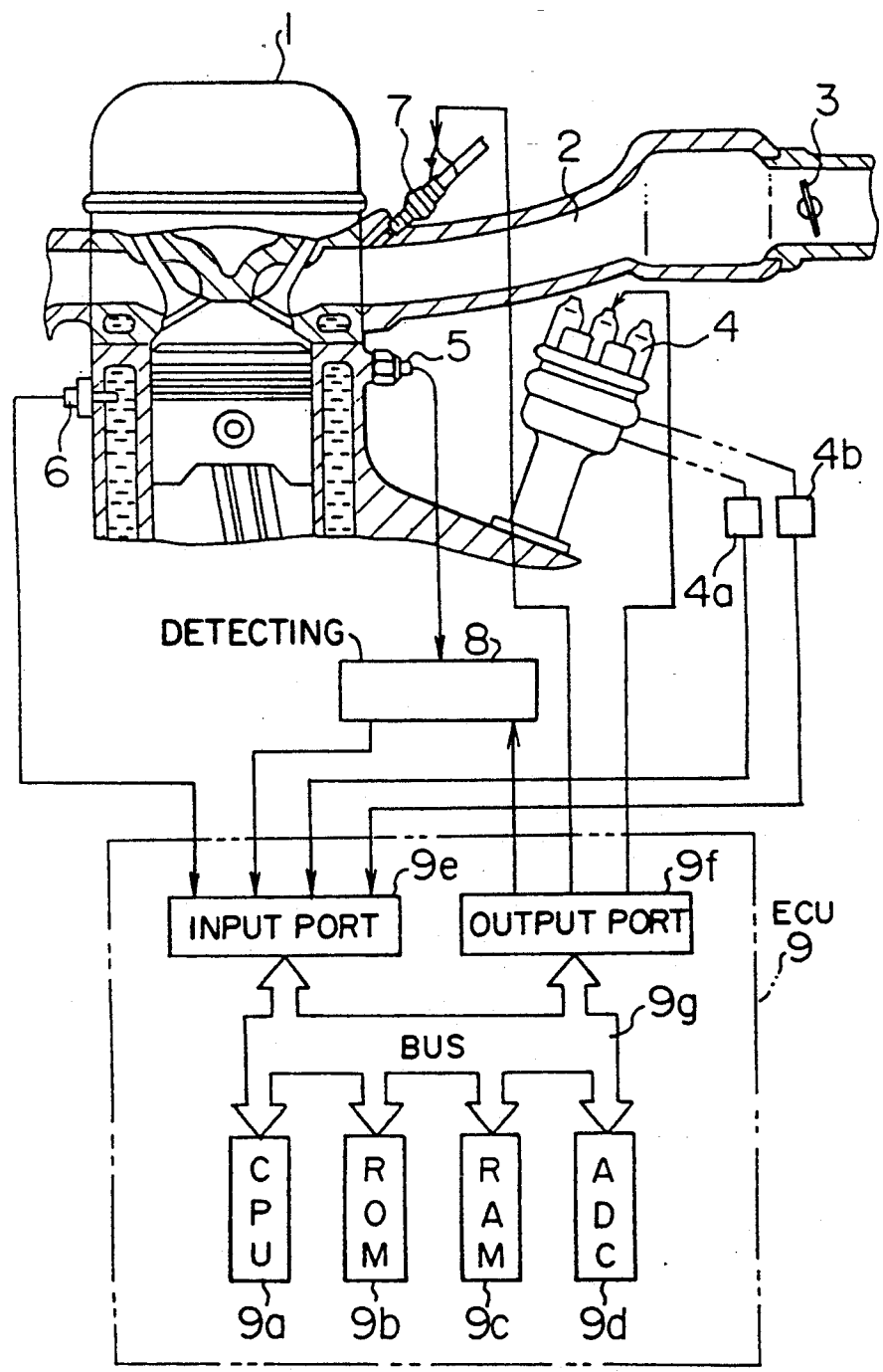
FIG. 2 is a view showing the construction of first and second embodiments.

FIG. 2 is a structural diagram showing the first embodiment.

In FIG. 2, 1 denotes a four-cylinder four-cycle engine (referred to simply as engine) to which intake air is supplied from an intake pipe 2 through an air cleaner and an air flow meter which are not shown. The amount of the intake air supplied to the engine 1 is adjusted by a throttle valve 3. 4 denotes a distributor which includes therein a reference angle sensor 4a for detecting a reference crank angle (for example, a top dead center) and a crank angle sensor 4b for generating an output signal at every predetermined crank angle of the engine 1. An engine speed is calculated on the basis of the signal from the crank angle sensor 4b by an electronic control unit (ECU) 9 which will be described later.

5 denotes a knock sensor as knock detecting means for detecting the vibration of an engine block corresponding to a knocking phenomenon of the engine 1 piezoelectrically (by using a piezoelectric element) or electromagnetically (by using a magnet and a coil), and 6 denotes a water temperature sensor for generating a signal representing the temperature of a cooling water of the engine 1. 7 denotes an injector for injecting fuel into an intake manifold in accordance with a control signal from the ECU 9.

Figure 1:
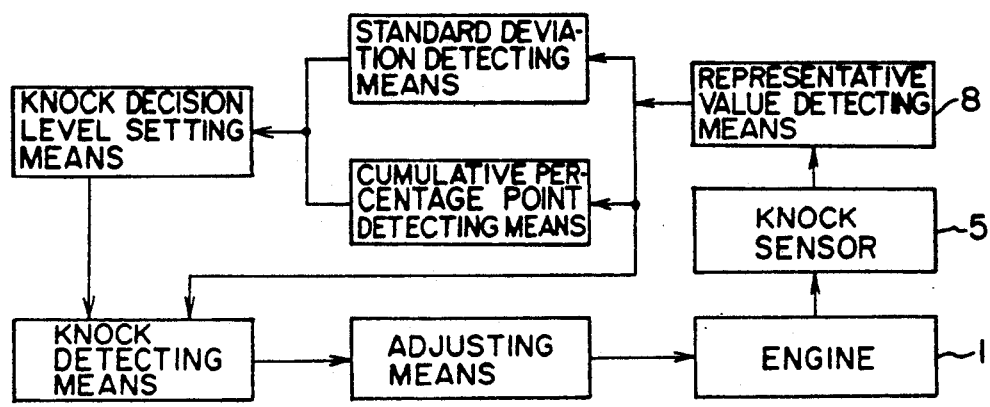
FIG. 1 is a functional block diagram showing the present invention.
Figure 3:
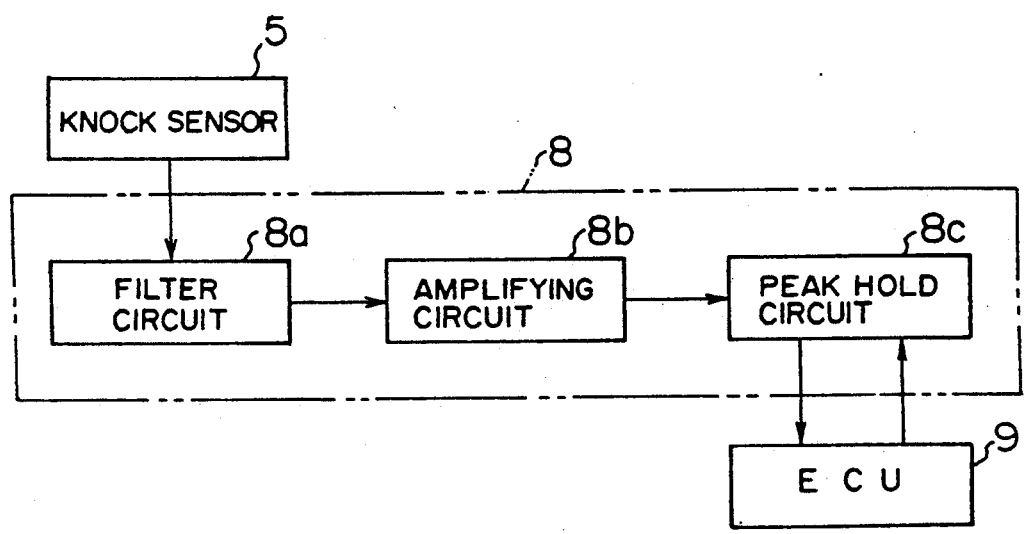
FIG. 3 is a block diagram showing the construction of representative value detecting means in the first and second embodiments.

8 denotes representative value detecting means for detecting representative values V from output signals of the knock sensor 5 (namely, knock sensor signals). As shown in FIG. 3, the representative value detecting means 8 is composed of a filter circuit 8a for selectively extracting only a knock frequency component of the knock sensor signal, an amplifying circuit 8b for amplifying a signal from the filter circuit 8a, and a peak hold circuit 8c for detecting, as a representative value V, a peak value $V_{peak}$ of the knock sensor signal occurring within a predetermined crank angle. In the present embodiment, the predetermined crank angle is defined, for example, by a constant period of time (a knock decision period) after the generation of an ignition output in order to prevent erroneous detection of a knock from being caused by noises, since a knock is generated only during a combustion period.

As is well known, the ECU 9 is composed of a central processing unit (CPU) 9a which performs various operations, a read only memory (ROM) 9b in which a control program and so on are stored, a writable/readable random access memory (RAM) 9c which temporarily stores processed data and so on, an analog-digital converter (ADC) 9d which converts an analog signal into a digital signal, an input port 9e which takes in sensor signals from the above-mentioned various sensors into the ECU 9, an output port 9f which outputs control signals to the above-mentioned various actuators, and a bus 9g which interconnects the above-mentioned components with each other.

The ECU 9 controls ignition timing, a fuel injection quantity and so on in accordance with the signals from the various sensors and a state of generation of a knock.

The detection of a knock and the setting of a knock decision level $V_{KD}$ will now be explained on the basis of flow charts shown in FIGS. 4, 7, 9, 11, 12 and 16.

The following routine is processed at every cycle and is started immediately after the falling of a gate signal outputted from the ECU 9 to the peak hold circuit 8c, that is, immediately after the ECU 9 has read in the peak value $V_{peak}$.

Figure 4:
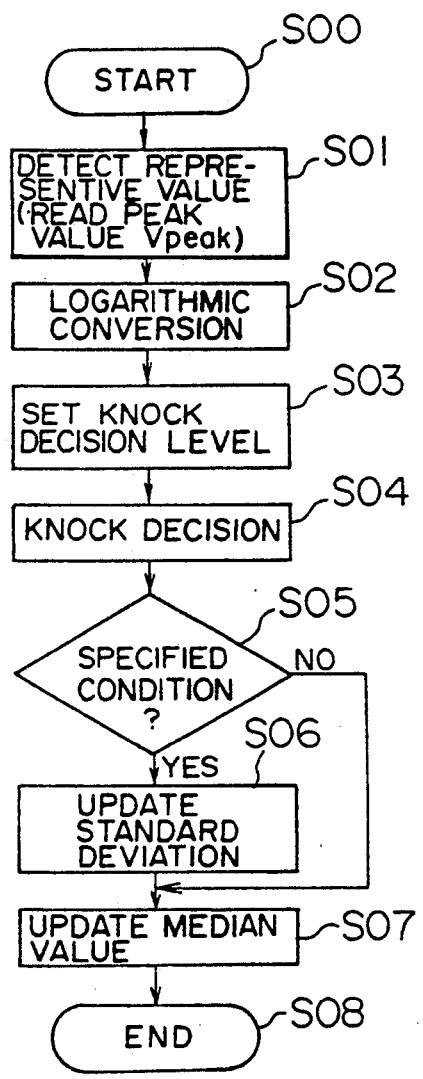
FIGS. 4, 7, 9, 11, 12, 14 and 16 are flow charts useful in explaining the operation of the first embodiment.

Referring to the flow chart shown in FIG. 4, the routine starts from step S00. In step S01, the peak value $V_{peak}$ detected by the peak hold circuit 8c is read in.

In step S02 which is a correcting step, the peak value $V_{peak}$ is subjected to logarithmic conversion in accordance with the following equation to obtain $IV_{pk}$.

$$IV_{pk} = A \times \log(V_{peak}/a) \tag{1}$$

$A = 64/\log(4)$
$a = 4$ where A and a are constants (the details of which will be described later). In subsequent step S03 which is a knock decision level setting step, a knock decision level $V_{KD}$ is set (the details will be described later).

Here, $V_{KD}$ is a knock decision level which is determined by the use of a graph of the frequency distribution of $IV_{pk}$ which represents logarithmic conversion of representative values $V_{peak}$. In step S04, knock detection is performed. If $IV_{pk} \geq V_{KD}$, the occurrence of a knock is decided.

Ignition timing, etc. are controlled in a knock control region (for example, a heavy load region) in accordance with the result of the decision. In step S05, a decision is made as to whether the operating condition of the engine satisfies a specified condition. This specified condition is defined, for example, by one of or a plurality of the following conditions:

1. a load on the engine is equal to or greater than a predetermined value;
2. an engine speed Ne is within a predetermined range;
3. a rate of change of the engine load is equal to or smaller than a predetermined value; and
4. a median value $V_{MED}$ of the distribution of $IV_{pk}$ is within a predetermined range.

The processing proceeds to step S06, if the result of step S05 is YES, while, to step S07, if the result of step S05 is NO. In step S06 which is a standard deviation detecting step, a value (standard deviation) SGM corresponding to a standard deviation of the frequency distribution (normal distribution) of the logarithmic conversion values $IV_{pk}$ is changed (the details of which will be described later). In step S07 which is a cumulative percentage point detecting steps a cumulative percentage point of the frequency distribution of the logarithmic conversion values $lV_{pk}$ (in the present embodiment, it is a 50% point, that is, a median value $V_{MED}$) is changed (the details of which will be described later).

In step S08, the processing ends.

Next, the logarithmic conversion performed in the above-mentioned step S02 will be explained.

In the present embodiment, the constants A and a in the equation (1) are assumed as:

A = 64/log 4, and a = 4

The values of the constants A and a are defined on the assumption that:

1. the entire logarithmic normal distribution (FIG. 5) of peak values $V_{peak}$ when a knock does not occur at all (where the ratio of a larger output to a smaller output is about 4) is divided into 64 parts; and 2. a 10-bit $V_{peak}$ value obtained through A/D conversion by the ADC 9d is compressed to 8-bit data so that the data may be processed easily by using a 4-bit or 8-bit CPU.

In the following, equations which satisfy the above two conditions will be derived.

Figure 5:
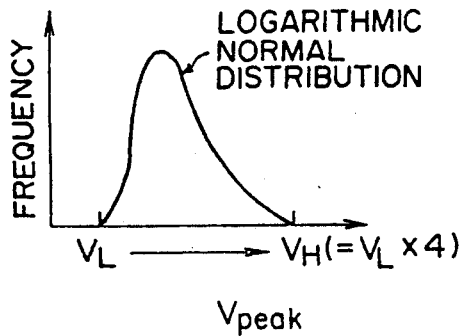
FIGS. 5, 6, 10A to 10D, 13A and 13B, 15, 19 and 24A to 24C are characteristic diagrams showing the frequency distribution of representative values.
Figure 6:
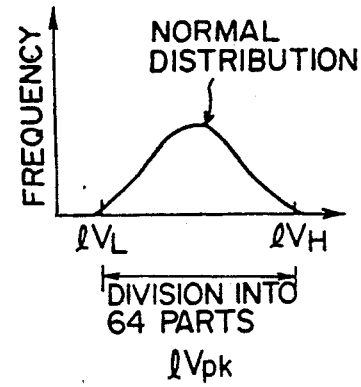

A logarithmic normal distribution shown in FIG. 5 is converted to such a normal distribution as shown in FIG. 6.

Assumption is made as follows.

$$lV_L = A \times \log(V_L/a) \quad (2)$$

$$lV_H = A \times \log(V_H/a) \quad (3)$$

Firstly, in order to divide the whole distribution into 64 parts, it is necessary that the following relation is satisfied.

$$lV_H - lV_L = 64 \quad (4)$$

Further, $$V_H = 4 \times V_L \quad (5)$$

Accordingly, the following relation is obtained from the above equations (2) to (5):

$$A \times \log 4 = 64$$

$$\therefore A = 64/\log 4$$

Next, in order to convert the maximum value $2^{10}$ for a 10-bit A/D conversion value and to thereby obtain the maximum value 28 for 8-bit data, the following relation should be satisfied:

$$2^8 = A \times \log(2^{10}/a)$$

$$\therefore a = 1024/\exp(256/A) = 4$$

Accordingly, a logarithmic conversion equation satisfying the above-mentioned conditions is as follows:

$$lV = 64/\log(4) \times \log(V/4)$$

(It is not absolutely necessary to define the constants A and a to assume the above-mentioned values, respectively).

In the present state of art, direct logarithmic conversion by using the CPU 9a takes a log time and therefore it is not applicable to practical control. Therefore, in practical control, it is desirable that logarithmic conversion values $lV_{pk}$ corresponding to peak values $V_{peak}$ are calculated beforehand and are stored in the ROM 9b, and then the stored calculated values are sequentially read out from the ROM 9b. Further, in the case where a peak value $V_{peak}$ is not smaller than $2^8$, the peak value $V_{peak}$, which is not smaller than $2^8$, can be determined by reading a logarithmic conversion value $lV_{pk}$ corresponding to the value of one fourth of the peak value $V_{peak}$ from the ROM 9b and adding 64 to the read-out value. Therefore, $2^8 (= 256)$ bytes suffice as data to be stored in the ROM 9b.

Figure 7:
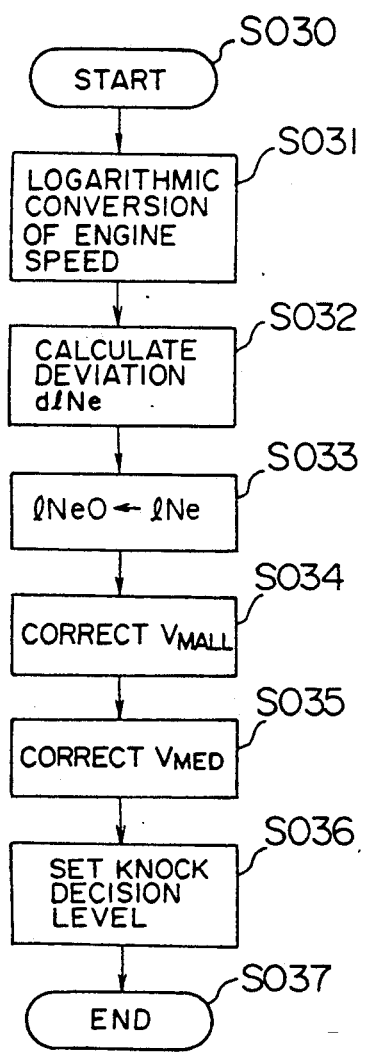

The setting of the knock decision level in step S03 shown in FIG. 4 will be explained on the basis of a flow chart shown in FIG. 7. This routine starts from step S030. In step S031, an engine speed Ne is subjected to logarithmic conversion. A manner of logarithmic conversion in step S031 is the same as that of step S02 shown in FIG. 4. In step S032, a deviation dlNe between the logarithmic conversion value lNe of an engine speed Ne at the present control timing and the logarithmic conversion value lNeO of an engine speed Ne at the preceding control timing is obtained. In subsequent step S033, the present logarithmic conversion value lNe is stored so that it is used at the next control timing as a preceding logarithmic conversion value lNeO. In step S034, a mean value $V_{MALL}$ of logarithmic conversion values $lV_{pk}$ of peak values $V_{peak}$ for all engine cylinders is corrected in accordance with the following equation (the details will be described later):

$$V_{MALL} \leftarrow V_{MALL} + \beta \times dlNe$$

where $\beta$ is a constant whose value is about 2, and the mean value $V_{MALL}$ is changed at every control timing of step S07 shown in FIG. 4.

In subsequent step S035, a median value $V_{MED}$ is corrected in accordance with the following equation:

$$V_{MED} \leftarrow V_{MALL} + dV_{MED}$$

where $dV_{MED}$ is a deviation between a median value $V_{MED}$ for each cylinder and the mean value $V_{MALL}$. This deviation $dV_{MED}$ is changed at every control timing of step S07 shown in FIG. 4.

In step S036, a knock decision level $V_{KD}$ is set in accordance with the following equation:

$$V_{KD} \leftarrow u \times SGM + V_{MED}$$

where $V_{KD}$ is a knock decision level obtained by using a graph of the frequency distribution of $lV_{pk}$ which represents logarithmic conversion of representative values $V_{peak}$, u is a value set in accordance with the engine speed Ne (the details will be described later), SGM is a value corresponding to a standard deviation in the frequency distribution of logarithmic conversion values $lV_{pk}$, and $V_{MED}$ is a median value in the frequency distribution of logarithmic conversion values $lV_{pk}$. In step S037, the processing of the routine ends.

Next, an explanation will be made of the correction of the mean value $V_{MALL}$ in step S034 in FIG. 7.

The present inventors have conducted experiments on various engines and have found that a median value $V_{MED}$ in the frequency distribution of logarithmic conversion values $lV_{pk}$ of peak values $V_{peak}$ is given by the following equation:

$$V_{MED} = V_O \times (Ne)^\beta$$

where $V_O$ and $\beta$ are constants determined by an engine, a cylinder, a knock sensor, etc., $\beta$ has a value of about 1.5 to 2.5, and Ne is an engine speed.

Now, assume that the engine speed Ne is varying at a rise rate $a_{RPM}$/sec. Then, a rise rate $dV_{MED}/dn$ of the median value $V_{MED}$ per cycle (n: the number of cycles) is as follows:

$$\frac{dV}{dn} MED =$$

$$\frac{dV}{dNe} MED \cdot \frac{dNe}{dt} \cdot \frac{dt}{dn} = V_O \cdot \beta \cdot (Ne)^{\beta-1} \cdot a \cdot \frac{120}{Ne}$$

Approximating $\beta$ by 2, we obtain $$dV_{MED}/dn = 240 \cdot a \cdot V_O$$

Namely, the follow-up delay of a mean value $V_{MALL}$ at the time of transition can be prevented by adding only $240 \cdot a \cdot V_O$ to the mean value $V_{MALL}$ at every cycle.

However, since $V_O$ greatly differs with each engine, each cylinder, a knock sensor, etc., there exists no addend value which satisfies a combination of all such conditions. Accordingly, it is difficult to suitably correct the mean value $V_{MALL}$ in accordance with the rise rate $a$.

The influence of $V_O$ can be eliminated by subjecting peak values $V_{peak}$ and an engine speed Ne to logarithmic conversion.

More precisely, both sides of the above equation $V_{MED} V_O \times (Ne)^\beta$ are subjected to logarithmic conversion. Then, $$\begin{aligned} lV_{MED} &= A \times \log(V_{MED}/a) \\ &= A \times \log\left[\frac{V_O \times (Ne)^\beta}{a}\right] \\ &= A \times \log V_O + (\beta - 1)\log a + \beta \times A \times \log\left[\frac{Ne}{4}\right] \end{aligned}$$

By using the equation (1) for representing a logarithmic conversion value of x by lx, we obtain $$lV_{MED} = A \times \log V_O + (\beta - 1) \log a + \beta l Ne$$

Since the first term of the right side of the above equation is a constant term, the differentiation of both sides with respect to n gives the following equation:

$$dlV_{MED}/dn = \beta \times dlNe/dn$$

Accordingly, the mean value $V_{MALL}$ can be corrected disregarding the value of $V_O$, if a rise rate of logarithmic conversion of $V_{MED}$ is obtained by detecting dlNe/dn at every cycle or at every ignition timing and thereby calculating $\beta \times dlNe/dn$.

In the following, the setting of the knock decision level performed in step S036 shown in FIG. 7 will be explained.

Now, assume a way or an amount of advance/retardation to be the retardation of 1° CA per one knock and the advance of 1° CA per one second when no knock is generated. According to this way of advance/retardation, the frequency of knock decision by which the advance/retardation is stabilized is once per second when no knock is generated. When the knock decision level $V_{KD}$ is set so that the frequency of knock decision is once per second, ignition timing is controlled to be substantially constant, since the amount of retardation R converges to a constant value.

However, the maximum torque of the engine is obtained in a region where a certain number of knocks are generated. Therefore, it is necessary that control is made so that the ignition timing is always in an advanced state when no knock is generated.

Accordingly, it is desirable that a knock decision frequency is set to be lower than the above-mentioned knock decision frequency by which the advance/retardation is stabilized.

Now, assuming that the knock decision frequency in the case of a four-cylinder engine is once per four seconds, a knock decision probability $P_K$, that is, a probability of making knock generation decision per combustion cycle and per cylinder, is represented by $$P_K = \frac{120}{Ne} \times \frac{1}{4} \times \frac{1}{4}$$

Figure 8:
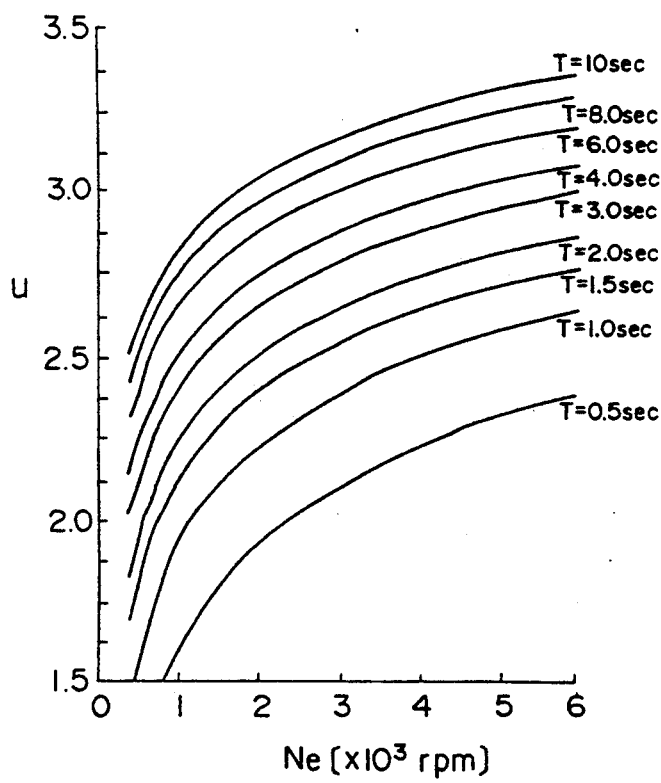
FIG. 8 is a characteristic diagram showing the relation between the rotational speed of the engine and the value of u.

If the engine speed Ne=2000 rpm, then $P_K$=0.00375, and, as the value of u for this knock decision probability $P_K$, u=2.67 can be derived from a normal distribution table. Also, if the engine speed Ne=4000 rpm, $P_K$=0.001875 and u=2.90 can be derived. FIG. 8 is a characteristic diagram showing a relation between the engine speed Ne and the value of u. Here, the parameter T denotes a period in which a knock is detected. As is clearly understood from the characteristic diagram of FIG. 8, when the knock detection frequency is constant (namely, T is constant), the value of u becomes larger as the engine speed Ne increases.

Usually, it is possible to univocally set the knock detection frequency, since the way or amount of advance/retardation is constant. Therefore, it is desirable that the values of u corresponding to engine speeds Ne are obtained beforehand from the normal distribution table and are stored in the ROM 9b, and then the stored values of u corresponding to engine speeds Ne are sequentially read from the ROM 9b.

Also, since a knock is hard to occur under a light load, the value of u under a light load may be made large by detecting a load on the engine 1.

In the present embodiment, the value of u is set so as to give a predetermined knock detection frequency (for example, T=4). However, in order that control is made so that the ignition timing is always in an advanced state when no knock is generated, the value of u may be set to a value larger than a value given by the characteristic curve for T=1 shown in FIG. 8, for example, in the case of the above-mentioned way of advance/retardation.

This routine starts from step S040. Firstly, in step S041, a knock decision is made in accordance with a logarithmic conversion value $lV_{pk}$ of a peak value $V_{peak}$. More precisely, a decision on the generation of a knock is made when the following equation is satisfied:

$$lV_{pk} \geq V_{DK}$$

The processing proceeds to step S042 when a knock is generated, while, to step S049 when no knock is generated.

In steps S042 to S046, a retardation amount R is calculated in accordance with the magnitude of the logarithmic conversion value $lV_{pk}$. Firstly, in step S042, a decision is made as to whether the logarithmic conversion value $lV_{pk}$ satisfies the following equation:

$$lV_{pk} \geq V_{DK} + SGM$$

If this equation is not satisfied, the retardation amount R is set in step S046 so as to be increased by a predetermined value $\Delta R$. This predetermined value $\Delta R$ may be found in the above-mentioned way of advance/retardation. In the case of the above-mentioned way, $\Delta R = 1°$ CA results.

If the above equation is satisfied in step S042, the processing proceeds to step S043.

In step S043, a decision is made as to whether the logarithmic conversion $lV_{pk}$ satisfies the following equation:

$$lV_{pk} \geq V_{DK} + 2 \times SGM$$

If this equation is not satisfied, the retardation amount R is set in step S045 so as to be increased by a predetermined value $2 \times \Delta R$.

If the above equation is satisfied in step S043, the retardation amount R is set in step S044 so as to be increased by a predetermined value $3 \times \Delta R$.

In steps S047 and S048, guard processings are performed with respect to the retardation amount R. Firstly, in step S047, a decision is made as to whether the retardation amount R set in step S044, S045 or S046 is larger than an upper limit value $R_{max}$. Here, the upper limit value $R_{max}$ is a value set in accordance with the state of an engine. If the retardation amount R is larger than the upper limit value $R_{max}$, the retardation amount R is set again in step S048 to the upper limit value $R_{max}$.

If the retardation amount R is decided in step S047 to be smaller than the upper limit value $R_{max}$, the processing proceeds to step S049. In step S049, a decision is made as to whether a predetermined time Tad has elapsed. Here, the predetermined time Tad is a time required for making advance. For example, in the present embodiment, Tad is selected to be one second. If the predetermined time Tad has elapsed, the retardation amount R is set in step S04A so as to be decreased by the predetermined value $\Delta R$.

In subsequent steps S04B and S04C, guard processings are performed with respect to the retardation amounts R. Firstly, in step S04B, a decision is made as to whether the retardation amount R is smaller than a lower limit $R_{min}$. Similarly to the upper limit values $R_{max}$, the lower limit value $R_{min}$ is a value set in accordance with the state of the engine. If the retardation amount R is smaller than the lower limit value $R_{min}$, the retardation amount R is set again in step S04C to the lower limit value $R_{min}$.

In this manner, the processing of the knock decision routine is completed.

Taking controllability into consideration, it is preferable that the retardation amount R, in the case where a knock takes place concentratedly in one or two cylinders, is set to be larger than that in the case where a knock takes place distributively in a plurality of cylinders. For example, a cylinder, in which a knock has taken place, is stored, and a predetermined value $2 \times \Delta R$ is added to the retardation amount R to provide increased retardation when a knock takes place successively in the same cylinder.

Figure 9:
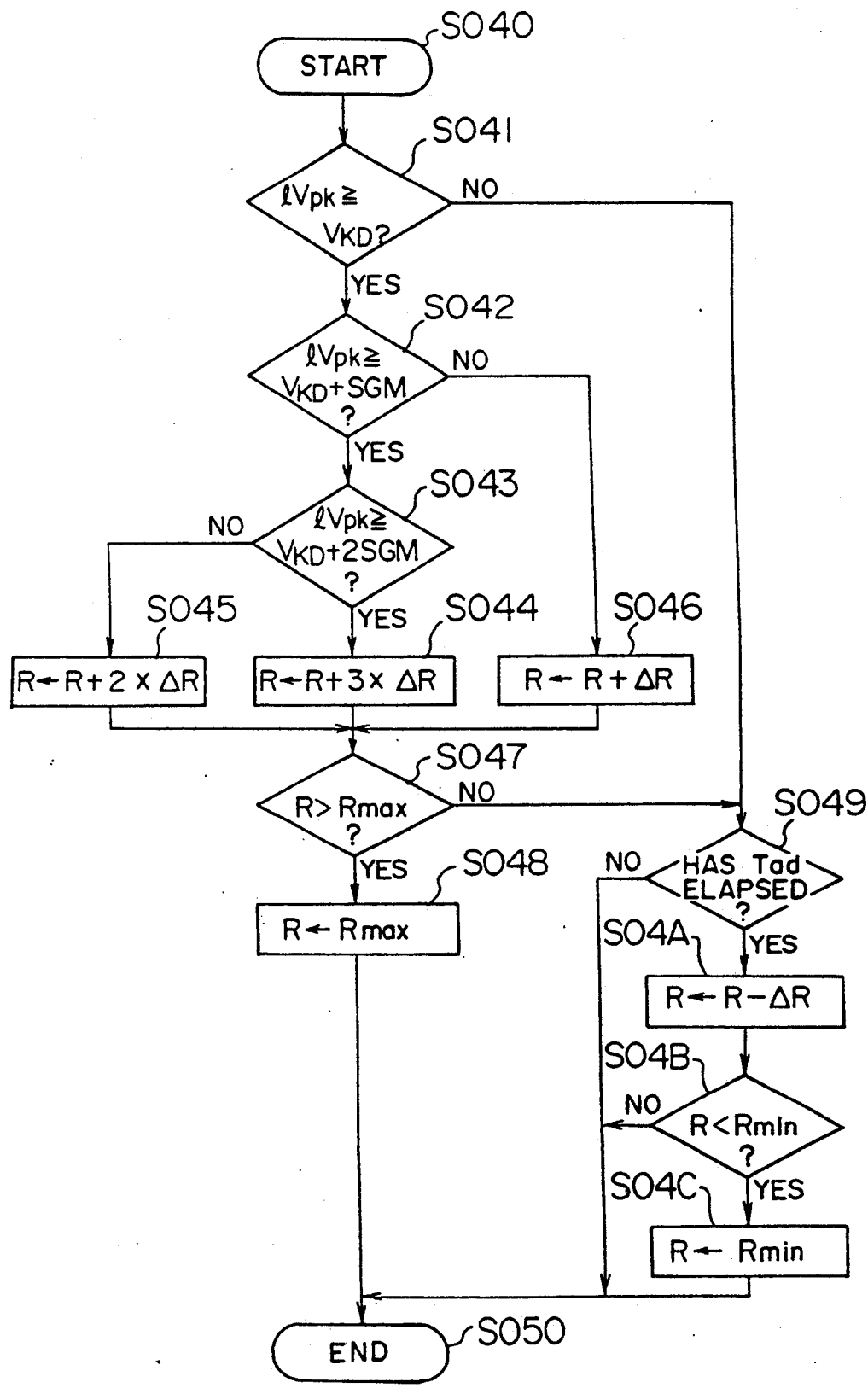

Next, an explanation will be made of the processing in step S042 shown in FIG. 9 which changes a retardation amount R depending on whether or not a logarithmic conversion value $lV_{pk}$ is larger than the sum of the knock decision level $V_{KD}$ and a standard deviation SGM.

Figure 10A:
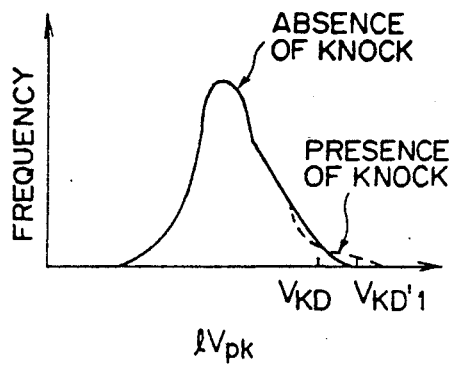
Figure 10B:
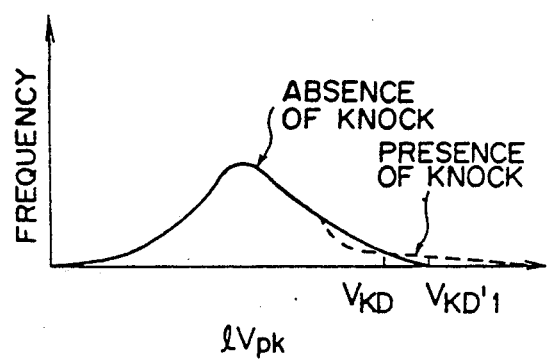
Figure 10C:
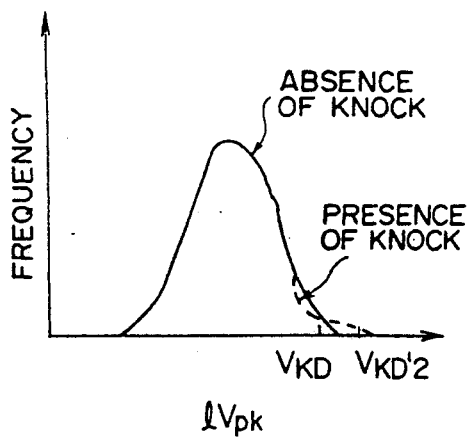
Figure 10D:
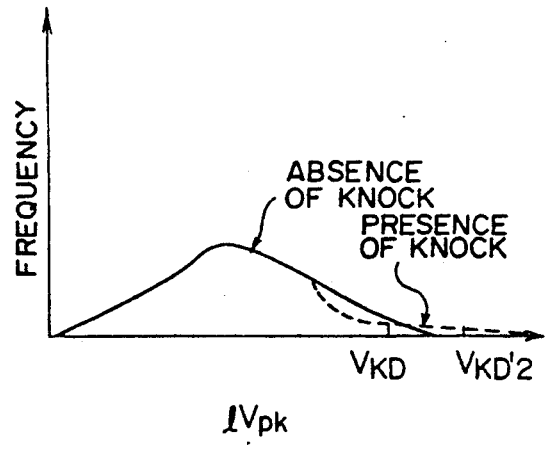

In FIGS. 10A and 10B, the distribution of logarithmic conversion values $lV_{pk}$, when no knock is generated, is a normal distribution as shown by solid line, and the distribution thereof when a knock is generated (namely, in the case of mixed occurrence of a cycle, in which no knock takes place, and a cycle in which a knock takes place), becomes distorted at the high output side, as shown by broken line. Even in the case of a knock generation state of the same style of distorted distribution of logarithmic conversion values $lV_{pk}$, the degree of distortion in the case where a standard deviation SGM of logarithmic conversion values $lV_{pk}$, when no knock is generated, is large as shown in FIG. 10B, is increased as compared with that in the case where the above-mentioned standard deviation SGM is small as shown in FIG. 10A. But the probability of $lV_{pk}$ falling in the distorted portion is the same. Therefore, if it is premised that a decision level used in judging the intensity of a knock is represented, for example, by $V_{KD'1} = V_{KD} + k$ (k: a constant) as compared with the fundamental decision level $V_{KD}$, there is a problem that the probability of logarithmic conversion values $lV_{pk}$ exceeding the knock decision level $V_{KD}$ may have a different value in spite of the same condition of knock generation. Since the present description is made based on the logarithmic axis in FIGS. 10A and 10B, the constant k is added. While, when based on the real number axis, the knock decision level $V_{KD}$ is multiplied by the constant k. Namely, the decision level $V_{KD'1}$ for judging the knock intensity is also a multiplication of the fundamental decision level $V_{KD}$ by a constant. Therefore, even if the fundamental decision level has an optimum value, an accurate knock intensity decision cannot be made. On the other hand, if a knock intensity decision level is set by $V_{KD'2} = V_{KD} + SGM$ by using the standard deviation SGM as shown in FIGS. 10C and 10D, it is possible to set a knock intensity decision level $V_{KD'2}$ which conforms to the distribution pattern. Namely, the probability of logarithmic conversions values $lV_{pk}$ exceeding the knock intensity decision level $V_{KD'2}$ can be made identical for every distribution pattern.

Next, the change or updating of the standard deviation SGM in step S06 shown in FIG. 4 will be explained on the basis of a flow chart shown in FIG. 11.

This routine starts from step S060. In step S061, a decision is made as to whether a logarithmic conversion value $lV_{pk}$ falls within a range between $V_{MED} - SGM$ and $V_{MED}$.

The processing proceeds to step S062, if the above condition is satisfied, while, to step S063, if the above condition is not satisfied.

In step S062, the standard deviation SGM is changed in accordance with the following equation:

$$SGM \leftarrow SGM - 2 \times dsgm$$

where dsgm is a change quantity for the standard deviation SGM and is set in accordance with a change of the state of the engine. For example, when a deviation dlNe of a logarithmic conversion value lNe of an engine speed Ne is large, the change quantity dsgm is set to a large value. Further, when a change of the engine load is large, the change quantity dsgm is also set to a large value.

In step S063, the standard deviation SGM is changed in accordance with the following equation:

$$SGM \leftarrow SGM + dsgm$$

In this manner, the change routine of the standard deviation SGM is completed.

Another embodiment of the changing of the standard deviation SGM will be explained on the basis of a flow chart shown in FIG. 12.

This routine starts from step S065. In step S066, a decision is made as to whether a logarithmic conversion value $lV_{pk}$ falls within a range between $V_{MED} - SGM$ and $V_{MED} + SGM$. The processing proceeds to step S067, if the above condition is satisfied, while, to step S068, if the above condition is not satisfied.

In step S067, the standard deviation SGM is changed in accordance with the following equation:

$$SGM \leftarrow SGM - dsgm$$

In step S068, the standard deviation SGM is changed in accordance with the following equation:

$$SGM \leftarrow SGM + 2 \times dsgm$$

In this manner, the change routine of the standard deviation SGM according to this another embodiment is completed.

Now, an explanation will be made of the reason why the standard deviation SGM is obtained by the above processing.

Figure 11:
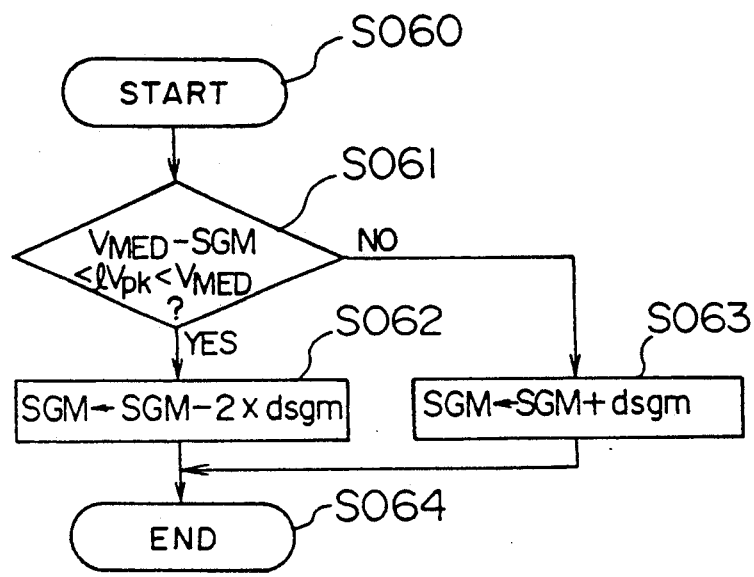
Figure 13A:
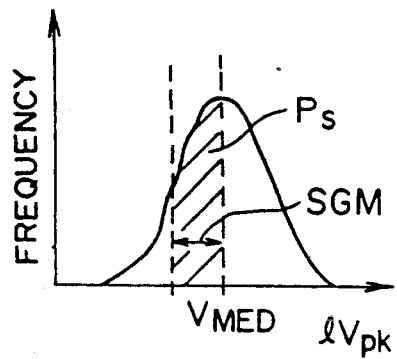

Assuming in FIG. 13A that the probability of a logarithmic conversion value $lV_{pk}$ to fall within the range (the hatched region) fr $V_{MED} - SGM$ to $V_{MED}$ is represented by $P_s$, $$-P_s \times 2 \times dsgm + (1 - P_s) \times dsgm = 0$$

$$\therefore P_s = \tfrac{1}{3}$$

results at a point where the standard deviation SGM is stabilized by the processing according to the flow chart shown in FIG. 11. When the value u corresponding to this standard deviation SGM is obtained from the normal distribution table, we obtain u=0.97 which is substantially equal to the standard deviation (u=1.0).

Figure 13B:
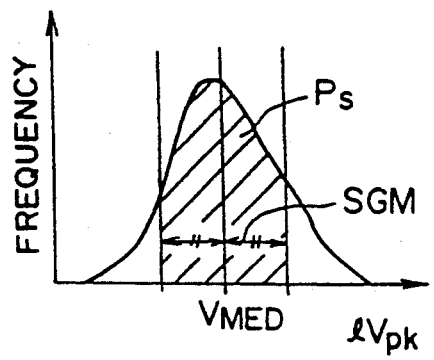

In the same way, assuming in FIG. 13B that the probability of a logarithmic conversion value $lV_{pk}$ to fall within the range (the hatched region) from $V_{MED} - SGM$ to $V_{MED} + SGM$ is represented by $P_s$, $$-P_s \times dsgm + (1 - P_s) \times 2 \times dsgm = 0$$

$$\therefore P_s = \tfrac{2}{3}$$

results at a point where the standard deviation SGM is stabilized by the processing according to the flow chart shown in FIG. 11. When the value of u corresponding to this standard deviation SGM is obtained from the normal distribution table, we obtain a value which is substantially equal to the standard deviation.

Figure 12:
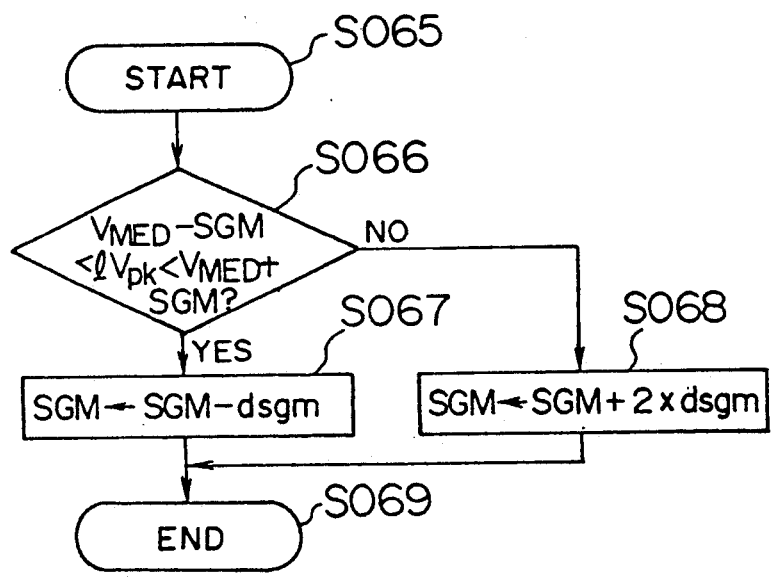

Thus, the standard deviation SGM can be obtained easily by the processing according to the flow chart shown in FIG. 11 or 12.

The processing is not limited to the above-described ones. For example, step S062 in FIG. 11 may be changed to the following equation:

$$SGM \leftarrow SGM - 3 \times dsgm.$$

However, in this case, $P_s = \tfrac{1}{4}$ results, and hence u=0.67 results. As a result, a standard deviation SGM to be obtained by the above equation has a value 0.67 times as large as that of the actual standard deviation.

Accordingly, if the balance of the quantities of an increase and a decrease of the standard deviation or the facility of a postprocessing is taken into consideration, the processing shown in FIG. 11 or 12 is preferable.

Figure 14:
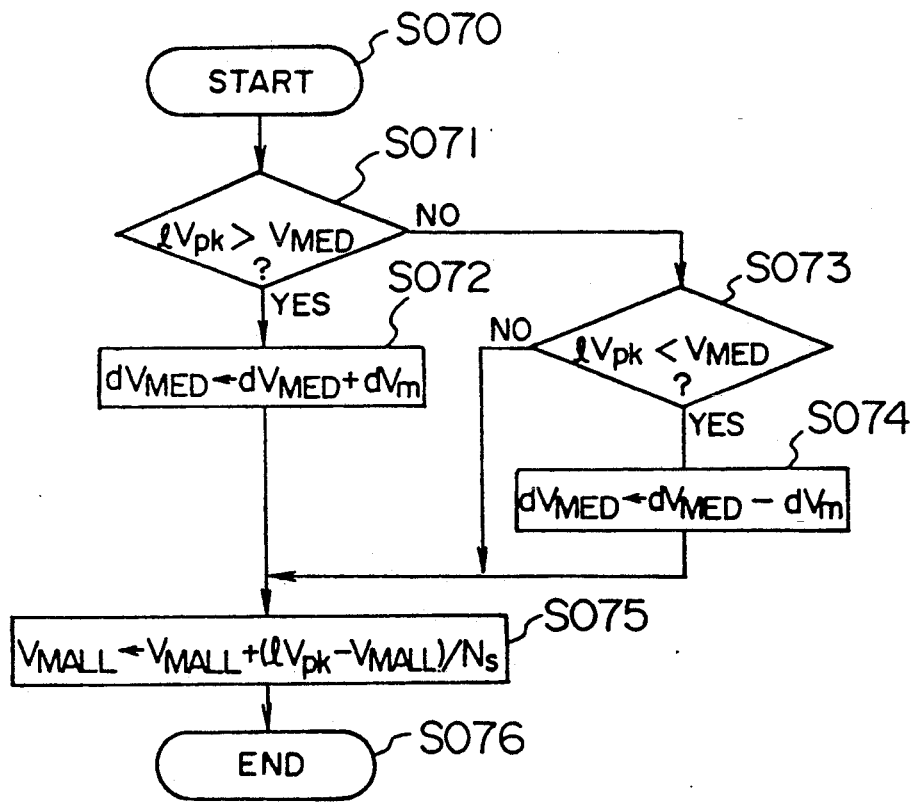

Next, the updating of a median value $V_{MED}$ in step S07 shown in FIG. 4 will be explained based on a flow chart shown in FIG. 14.

This routine starts from step S070. In step S071, a decision is made as to whether a logarithmic conversion value $lV_{pk}$ is larger than the median value $V_{MED}$. The processing proceeds to step S072, if $lV_{pk} > V_{MED}$, while, to step S073, if $lV_{pk} \leq V_{MED}$.

In step S072, the operation of $dV_{MED} \leftarrow dV_{MED} + dV_m$ is performed. Then, the processing proceeds to step S075. Here, $dV_m$ represents a change quantity for a deviation $dV_{MED}$. In step S073, a decision is made as to whether a logarithmic conversion value $lV_{pk}$ is smaller than the median value. The processing proceeds to step S074, if $lV_{pk} < V_{MED}$, while step S075, if $lV_{pk} \geq V_{MED}$. In step S074, the operation of $dV_{MED} \leftarrow dV_{MED} - dV_m$ is performed. In step S075, the operation of $V_{MALL} \leftarrow V_{MALL} + (lV_{pk} - V_{MALL})N_s$ is performed. Here, $N_s$ is a constant to be set in accordance with a change of the state of the engine. For example, if the deviation $dlNe$ of a logarithmic conversion value of an engine speed is large, the constant $N_s$ is made small. Also, it is effective to decrease the value of the constant $N_s$ only during a predetermined period after a load or the change rate of the load has satisfied a specified condition (for example, a heavy load or a large load change rate).

The above processing provides the following effects.

Since a knock intensity value is subjected to logarithmic conversion so that a signal from the knock sensor has a normal distribution, and a knock decision level is determined based on the median value and the standard deviation, it is possible to make accurate knock decision without being affected by a change in distribution due to a variation of each engine, each cylinder, a knock sensor, etc.

Also, since the median value and the standard deviation are changed at every cycle, it is possible to set a suitable knock decision level rapidly.

10-bit data can be compressed into 8-bit data by having the knock intensity value subjected to logarithmic conversion in accordance with the following equation:

$$lV = A \times \log\left[\frac{V}{a}\right]$$

Accordingly, handling of data by using a 4-bit or 8-bit CPU can be made easy.

Since an engine condition is subjected to logarithmic conversion and a knock decision level is corrected in accordance with the result of logarithmic conversion, it is possible to prevent a delay in the follow-up of a knock decision level at the time of transition.

Further, since the processing is performed by using a logarithmic operation so that it becomes possible to treat multiplication as addition and a power of a number by multiplication, a load imposed on the CPU can be reduced.

Furthermore, with respect to the setting of a knock decision level $V_{KD}$, since the value of u is set so that the knock decision probability becomes constant irrespective of the state of the engine when no knock is generated, it is not necessary to have a suitable value K determined beforehand, as done in the prior art.

The following processings may be added to the above-described first embodiment.

1. When the engine is in a predetermined state, a median value $V_{MED}$ and a standard deviation SGM for a specified cylinder or all cylinders are corrected.

This processing makes it possible to cope with a case where a median value $V_{MED}$ and a standard deviation SGM greatly change only in a certain state of the engine as compared with the other state of the engine.

As one example, assume a case where a standard deviation SGM of No. 3 engine cylinder in the state of Ne=3000 rpm is extremely large as compared with the other state or the other cylinders. In this case, even if the standard deviation SGM is changed at every cycle, there may be a possibility that a delay in the follow-up would occur according to a running condition. In order to solve such a problem, the following correction is made for example. Namely, the standard deviation SGM in step S036 in FIG. 7, step S061 in FIG. 11, and step S066 in FIG. 12 is corrected in accordance with the following equation:

SGM←SGM+SGMT where SGMT is a correction term for the standard deviation SGM, and it is stored in the ROM 9b in correspondence with logarithmic conversion values lNe of an engine speed. In the case of the above example, a difference between an extremely large standard deviation SGM and a normal standard deviation SGM, that is, a correction term SGMT is stored at a location in the ROM 9b corresponding to the vicinity of Ne=3000 rpm. Here, if a correction term SGMT for the other condition or the other cylinders is made zero, no bad influence is exerted. Thus, it is possible to prevent a delay in the follow-up of the standard deviation SGM from occurring at the time of transition and to prevent the standard deviation SGM under a steady running condition at Ne=3000 rpm from becoming extremely large as compared with that under the other conditions. In the above description, a standard deviation SGM has been taken as an example. However, a similar processing may be applicable to the case of a median value $V_{MED}$.

2. The standard deviation SGM is corrected in accordance with the probability of a logarithmic conversion value $lV_{pk}$ to fall within each of the regions shown in FIG. 15 which have been divided in accordance with the median value $V_{MED}$ and the standard deviation SGM. When the standard deviation SGM is changed in accordance with the flow chart shown in FIG. 12, the distribution of logarithmic conversion values $lV_{pk}$ can be divided into the regions 1, 2, 3 and 4 shown in FIG. 15 in accordance with the median value $V_{MED}$ and the standard deviation SGM. Assume that the probabilities of the logarithmic conversion values $lV_{pk}$ to fall into the regions 1, 2, 3 and 4 are represented by $P_1$, $P_2$, $P_3$ and $P_4$, respectively.

When no knock is generated, $P_1=P_4=1/6$ and $P_2=P_3=\frac{1}{3}$ hold. However, when a knock is generated so that the frequency distribution $lV_{pk}$ is distorted as shown by broken line, $P_3$ is decreased by a value corresponding to a hatched portion so that $P_3<\frac{1}{3}$ holds. Then, there occurs a phenomenon that the standard deviation SGM is made larger than a required value so as to satisfy $P_2+P_3=\frac{2}{3}$. This problem can be solved by detecting the occurrence of this phenomenon and correcting the standard deviation SGM in a direction of decreasing its value. When this phenomenon occurs, not only the relation $P_3<\frac{1}{3}$ holds, but also the following features result. Namely, as the standard deviation SGM becomes large, $P_1<1/6$ and $P_2>\frac{1}{3}$ result. Further, since $P_3+P_4=\frac{1}{3}$, then $P_4>1/6$ results. Therefore, if the above phenomenon is detected by using one or a combination of those features, the standard deviation SGM may be corrected in a direction of becoming smaller.

For example, the following processing is performed. The standard deviation SGM is increased by dsgm when the logarithmic conversion values $lV_{pk}$ have fallen into the region 1, it is decreased by dsgm when $lV_{pk}$ have fallen into the region 2, and it is increased by dsgm when $lV_{pk}$ have fallen into the region (3) and it is decreased by dsgm at every six cycles. Assuming that the probabilities of logarithmic conversion values $lV_{pk}$ to fall within the regions 1 and 4 are represented by Pe and Ph, respectively, an expected value ds of a change quantity of the standard deviation SGM per one cycle is represented by the following equation:

$$ds = 1 \times Pe - 1 \times (\tfrac{1}{2} - Pe) + 1 \times (\tfrac{1}{2} - Ph) - 1/6$$

Then, $$\begin{aligned} ds &= Pe - 1/2 + Pe + 1/2 - Ph - 1/6 \\ &= 2 \times Pe - Ph - 1/6 \end{aligned}$$

The condition of the stabilization of the standard deviation SGM is represented by ds=0. When no knock is generated, the frequency distribution of $lV_{pk}$ is symmetrical with respect to the median value $V_{MED}$. Thus, assuming $Pe=Ph=P$, $ds=P-1/6=0$ and hence $P=1/6$ result. Thus, it is possible to obtain a probability value which is close to the standard deviation.

Figure 15:
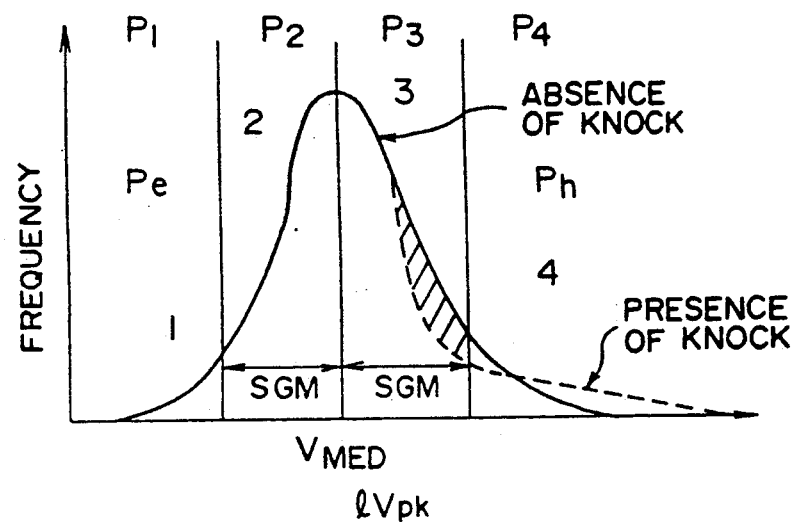

On the other hand, when a knock is generated and the frequency distribution is represented by a curve shown by broken line in FIG. 15, $Ph>1/6$ holds and hence ds<0 results. Thus, if the level of a knock exceeds a predetermined level, the standard deviation SGM changes to become smaller, thereby making it possible to elevate knock detecting capability.

Figure 16:
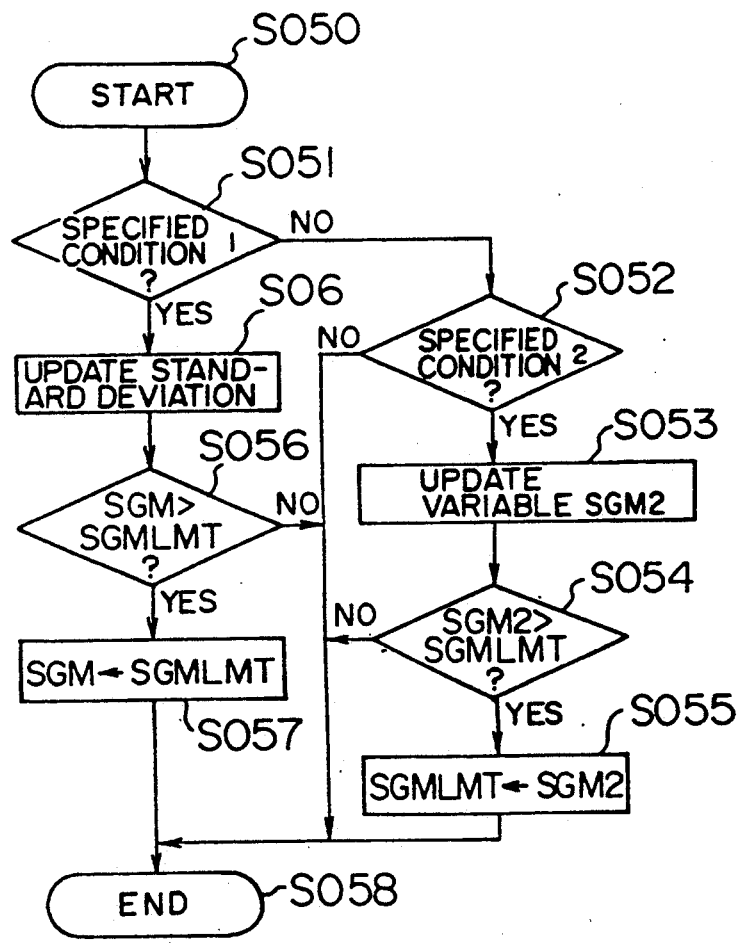

Further, it is also effective to restrict the standard deviation within a predetermined range by changing steps S05-S06 if FIG. 4 as shown in FIG. 16. This routine starts from step S050. In step S051 which is a first detecting step, a decision is made as to whether a specified condition 1 is satisfied. The processing proceeds to step S06, if the specified condition 1 is satisfied, while, to step S052, if the specified condition is not satisfied. The specified condition is, for example, the same with the specified condition in step S05 in FIG. 4. Also, step S06 in FIG. 16 may be the same with step S06 in FIG. 4. In step S052 which is a second detecting step, a decision is made as to whether a specified condition 2 is satisfied. The processing proceeds to step S053, if the specified condition 2 is satisfied, while, to step S058, if the specified condition 2 is not satisfied. The specified condition 2 is defined, for example, by one or a plurality of the following conditions:

a. a load on the engine is equal to or larger than a predetermined value;
b. an engine speed is within a predetermined range;
c. the change rate of an engine load is equal to or smaller than a predetermined value; and
d. the value of $V_{MED}$ is within a predetermined range.

In other words, the specified condition 1 is a condition under which a knock is apt to generate, whereas the specified condition 2 is a condition under which a knock is hard to generate. But, the specified conditions 1 and 2 are common to each other in that a suitable standard deviation SGM can be obtained, that is, the state of the engine is relatively stable and hence a sufficient resolution of a sensor signal can be obtained. In step S053, a standard deviation SGM2, which is a variable in the case of the specified condition 2, is updated. The manner of this updating is the same with that in step S06. In subsequent step S054, a comparison of magnitude is made between the variable SGM2 and an upper limit value SGMLMT. The processing proceeds to step S055, if SGM2>SGMLMT holds, while, to step S058, if SGM2<SGMLMT holds. In step S055, the value of the variable SGM2 is substituted for the upper limit value SGMLMT.

On the other hand, in step S056, a comparison of magnitude is made between the standard deviation SGM updated in step S06 and the upper limit value SGMLMT. The processing proceeds to step S057, if SGM>SGMLMT holds, while, to step S058, if SGM>SGMLMT holds. In step S057, the standard deviation SGM is set again to the upper limit value SGMLMT. This routine ends in step S058. In the foregoing embodiment, only the upper limit of the standard deviation SGM has been limited by the upper limit value SGMLMT. However, a lower limit thereof may also be limited.

Further, in the case of the specified condition 2, the standard deviation SGM has been limited by the maximum value of the standard deviation SGM2 in the case. However, not being restricted to the maximum value, the maximum value $+\alpha$ ($\alpha$: a constant) may be used to limit the standard deviation. Namely, the standard deviation SGM may be limited in accordance with the value of the variable SGM2 in a region where no knock is generated.

Instead of making such a limitation, another method may be employed in which a knock is decided to be large if a difference between the standard deviation SGM and the variable SGM 2 becomes equal to or larger than a predetermined value, and either a knocking control factor or a knock decision level is controlled in a direction of preventing a knock from being generated.

With the above-described processings, it becomes possible to prevent the standard deviation from becoming extremely large when a knock is generated.

In the above-described first embodiment, after knock intensity values have been detected, the detected knock intensity values are converted so that they have a normal distribution. Alternatively, it is possible to employ a construction in which output signals of the knock sensor or output signals of a band pass filter or the like have a normal distribution.

For example, an amplifier having a logarithmic characteristic is provided in a succeeding stage of a band pass filter and a knock intensity value is obtained from an output of the amplifier.

Alternatively, the knock sensor may be designed so that its output has a logarithmic characteristic.

In the above-described embodiment, a knock decision is made by using logarithmic conversion values IV which have been obtained by having representative values V subjected to logarithmic conversion. However, it is possible to make a knock decision by using representative values themselves.

In the following, an embodiment, in which a knock decision is made by using representative values themselves without having them subjected logarithmic conversion, will be explained based on a flow chart shown in FIG. 17.

Similarly to the above-described embodiment, the following routine is also started after the peak value $V_{peak}$ has been read from the peak hold circuit 8c shown in FIG. 3.

Figure 17:
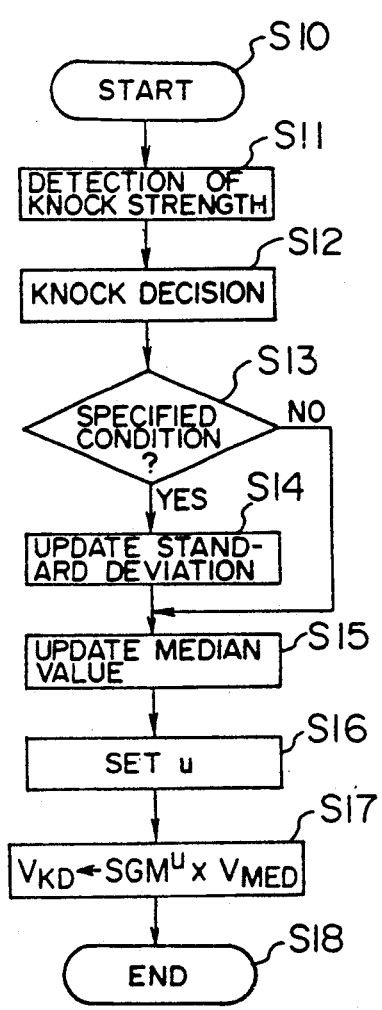
FIGS. 17, 18, 20, 21, 22 and 23 are flow charts useful in explaining the operation of the second embodiment.

Referring to the flow chart shown in FIG. 17, the routine starts from step S10. In step S11, representative values V of knock sensor signals are detected. The representative value V is, for example, a peak hold value $V_{peak}$ of a knock sensor signal generated within a predetermined crank angle, similarly to the first embodiment. In step S12, a knock decision is made. When $V \geq V_{KD}$ holds, the presence of a knock is decided. Here, $V \geq V_{KD}$ represents a knock decision level determined from a distribution curve of representative values V which are not subjected to logarithmic conversion. Like the first embodiment, ignition timing or the like is controlled in accordance with the result of the knock decision. In step S13, a decision is made as to whether the operating condition of the engine satisfies a specified condition. This specified condition is defined by, for example, one or a plurality of the following conditions:

1. a load on the engine is equal to or larger than a predetermined value;
2. an engine speed is within a predetermined range;
3. the change rate of an engine load is equal to or smaller than a predetermined value; and
4. the value of $V_{MED}$ is within a predetermined range.

The processing proceeds to step S14, if the result of step S13 is YES, while, to step S15, if it is NO. In step S14, a value SGM corresponding to a standard deviation of the frequency distribution of logarithmic conversion values log (V) of representative values V is changed (the details will be described later). In step S15, a median value $V_{MED}$ of the distribution of representative values V is changed (the details will be described later).

In step S16, the value of u corresponding to the knock decision frequency is obtained. This u is the same as the u of the foregoing first embodiment.

In step S17, a knock decision level $V_{KD}$ is set by the following equation in accordance with the standard deviation SGM and the median value $V_{MED}$:

$$V_{KD} = SGM^u \times V_{MED}$$

In step S18, this routine ends.

Figure 18:
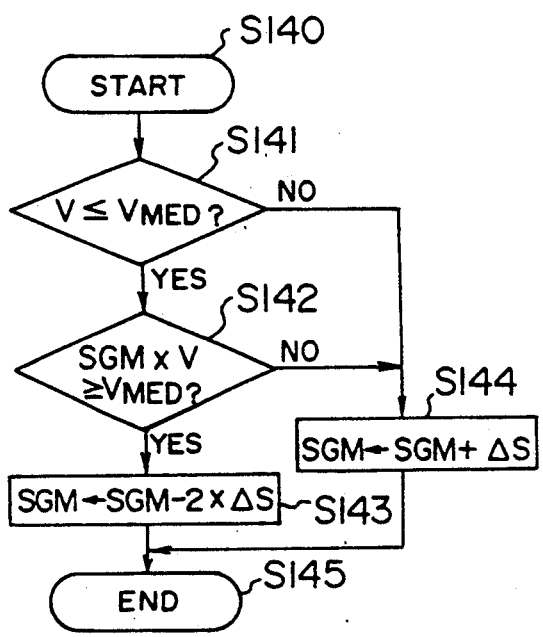

FIG. 18 is a detailed flow chart for the updating of the standard deviation SGM in step S14 in FIG. 17. This routine starts from step S140. In step 141, a decision is made as to whether $V \leq V_{MED}$ is satisfied. The processing proceeds to step S142, if the result of step 141 is YES, while, to step S144, if it is NO. In step S142, a decision is made as to whether $SGM \times V \geq V_{MED}$ is satisfied. The processing proceeds to step S143, if the result of step S142 is YES, while, to step S144, if it is NO. In step S143, SGM is decreased by $2 \times \Delta S$. In step S144, SGM is increased by $\Delta S$. Here, $\Delta S$ is a constant. In step S154, this routine ends.

Figure 19:
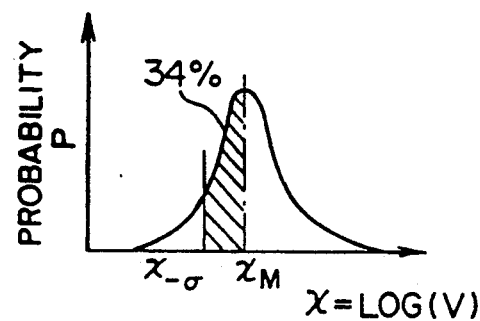

Next, the reason why SGM is given a value corresponding to a standard deviation of the log (V) distribution through the above-mentioned processing illustrated by FIG. 18 will be explained by making reference to FIG. 19. Assuming that a median value on the abscissa of the probability distribution of $x = \log$ (V) shown in FIG. 19 is represented by $x_M = \log (V_M)$, and a point $x_{-\sigma}$ on the abscissa is represented by $x_{-\sigma} = \log (V_M) - \sigma_x$ (where $\sigma_x$ denotes the standard deviation of the probability distribution in FIG. 19, the integration of the probability of a value of x to fall within a hatched portion in FIG. 19 is expressed by $$\int_{x_{-\sigma}}^{x_M} P(x)dx = 0.34$$

This means that the probability of the value of x to fall within the range of $x_{-\sigma} \leq x \leq x_M$ is 0.34. In a different view, it results from the processing shown in FIG. 18 that SGM is corrected so that the probability of representative values V to satisfy the relation of $V_{MED}/SGM \leq V \leq V_{MED}$ becomes $\frac{1}{3}$ (about 33%). Thus, an expected value $K_S$ of a change quantity of the standard deviation SGM per cycle is expressed by $$K_s = \int_{V_{MED}/SGM}^{V_{MED}} P(V) dV \times (-2 \times \Delta SGM) + \left(1 - \int_{V_{MED}/SGM}^{V_{MED}} P(V) dV \times \Delta SGM\right)$$

and then the value of the standard deviation SGM converges to a value which satisfies the relation $$\int_{V_{MED}/SGM}^{V_{MED}} P(V) dV = 1/3$$

which relation results from the above expression when $K_S$ becomes zero.

As a result, the relation $$\sigma_x = \log (SGM)$$

holds.

If this standard deviation SGM is used to satisfy the following equation, for example, $$V_{KD} = SGM^3 \times V_{MED}$$

it results that the knock decision level $V_{KD}$ is set to a point $x_{-3\sigma}$ on the abscissa of the $x = \log$ (V) distribution.

Figure 20:
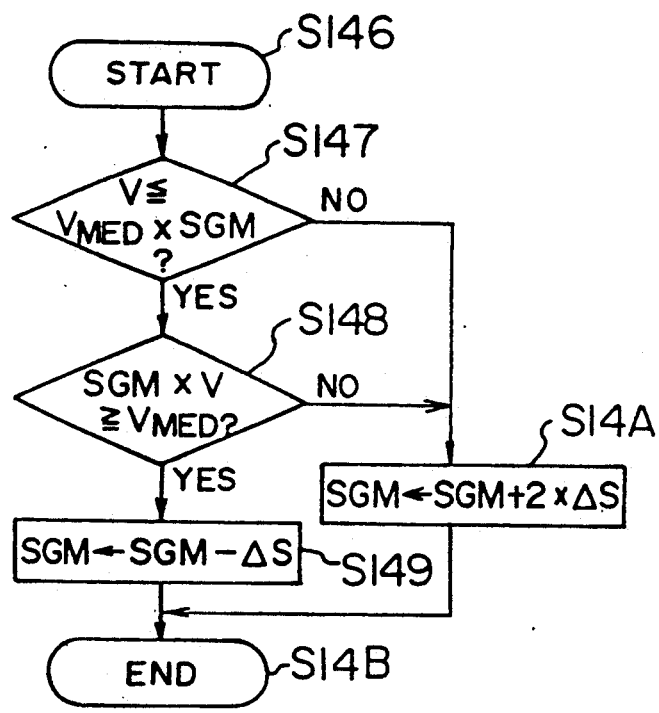

Further, a processing such as illustrated by a flow chart shown in FIG. 20 may also be employed as an embodiment other than that shown in FIG. 18.

This routine starts from step S146. In step S147, a decision is made as to whether $V \leq V_{MED} \times SGM$ is satisfied. The processing proceeds to step S148, if the result of step S147 is YES, while, to step S14A, if it is NO. In step 148, a decision is made as to whether $SGM \times V \leq V_{MED}$ is satisfied. The processing proceeds to step S149, if the result of step S148 is YES, while, to step S14A, if it is NO.

In step S149, SGM is decreased by $\Delta S$. In step S14A, SGM is increased by $2 \times \Delta S$. In step S14B, this routine ends.

Figure 21:
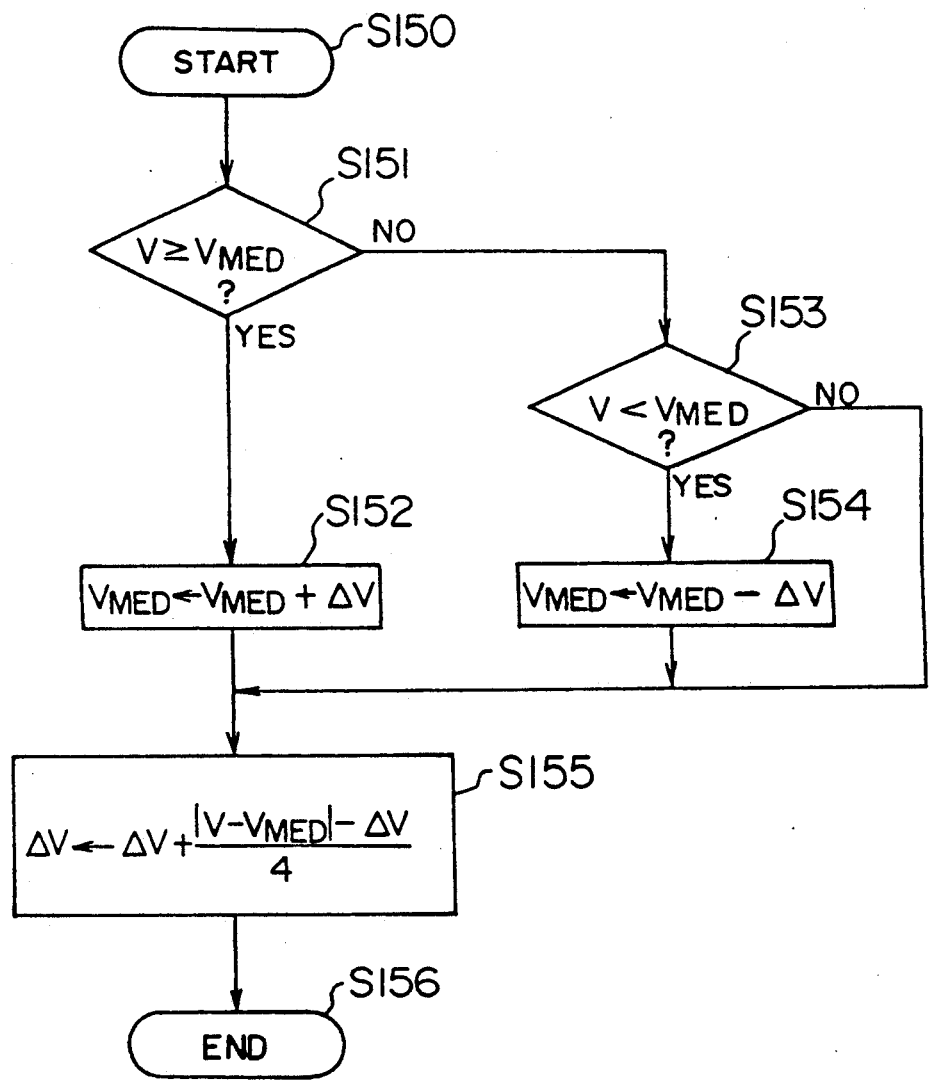

Next, a change routine for changing a median value $V_{MED}$ of the distribution of representative values V in step S15 in FIG. 17 will be explained in detail by making reference to FIG. 21. The change routine for changing $V_{MED}$ starts from step S150. In step S151, a decision is made as to whether $V \geq V_{MED}$ is satisfied. The processing proceeds to step S152, if the result of step S151 is YES, while, to step S153, if it is NO. In step S152, $V_{MED}$ is increased by $\Delta V$. In step S153, a decision is made as to whether $V < V_{MED}$ is satisfied. The processing proceeds to step S154, if the result of step S153 is YES, while, to step S155, if it is NO. In step S154, $V_{MED}$ is decreased by $\Delta V$. In step S155, $\Delta V$ is changed. In step S156, this routine ends.

In the above explanation, SGM and $V_{MED}$ are changed at every cylinder.

The decision level may be corrected by using a constant in order to change a knock control level in accordance with the state of the engine or each cylinder. For example $V_{KD}$ is set in accordance with the relation $V_{KD} = SGM^3 \times C \times V_{MED}$ (where C is a constant to be set in accordance with the state of the engine or each cylinder).

Also, it is effective to restrict C within a predetermined range, as occasion demands.

Further, it is also effective to restrict a knock decision level within a predetermined range, as occasion demands.

Figure 22:
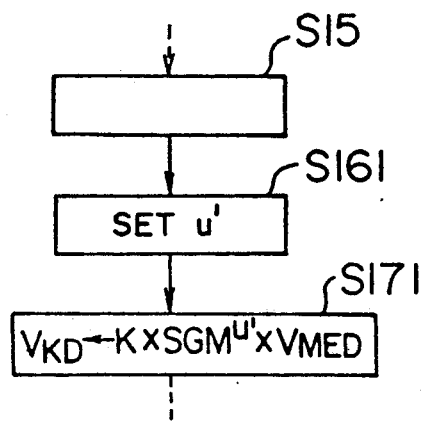

A further embodiment of the setting of the knock decision level other than that illustrated by steps S16 and S17 in FIG. 17 will be explained based on a flow chart shown in FIG. 22.

Firstly, the value of u' is obtained in step S161. Here, though u' is obtained by the use of a method same as the method of obtaining u used in step S16 in FIG. 17, u' should have a value corresponding to a knock decision frequency which provides a stabilized advance/retardation quantity when no knock is generated. For example, when the above-described way of determining an advance/retardation quantity is considered, the knock decision frequency at which an advance/retardation quantity becomes stabilized is once per second, and the knock decision probability in the case of a four-cylinder engine operating at an engine speed Ne of 2000 rpm is 1.5%. From the above-mentioned conditions, u' = 2.17 results.

Then, in step S171, a knock decision level is set in accordance with the following equation:

$$V_{KD} = K \times SGM^{u'} \times V_{MED}$$

where K is a constant larger than 1. Since the constant K is larger than 1, the above equation is equivalent to a case where U has been set to a value smaller than a value corresponding to the knock decision frequency at which an advance/retardation quantity is stabilized. Therefore, it is possible to assuredly make an advance whenever no knock is generated.

Figure 23:
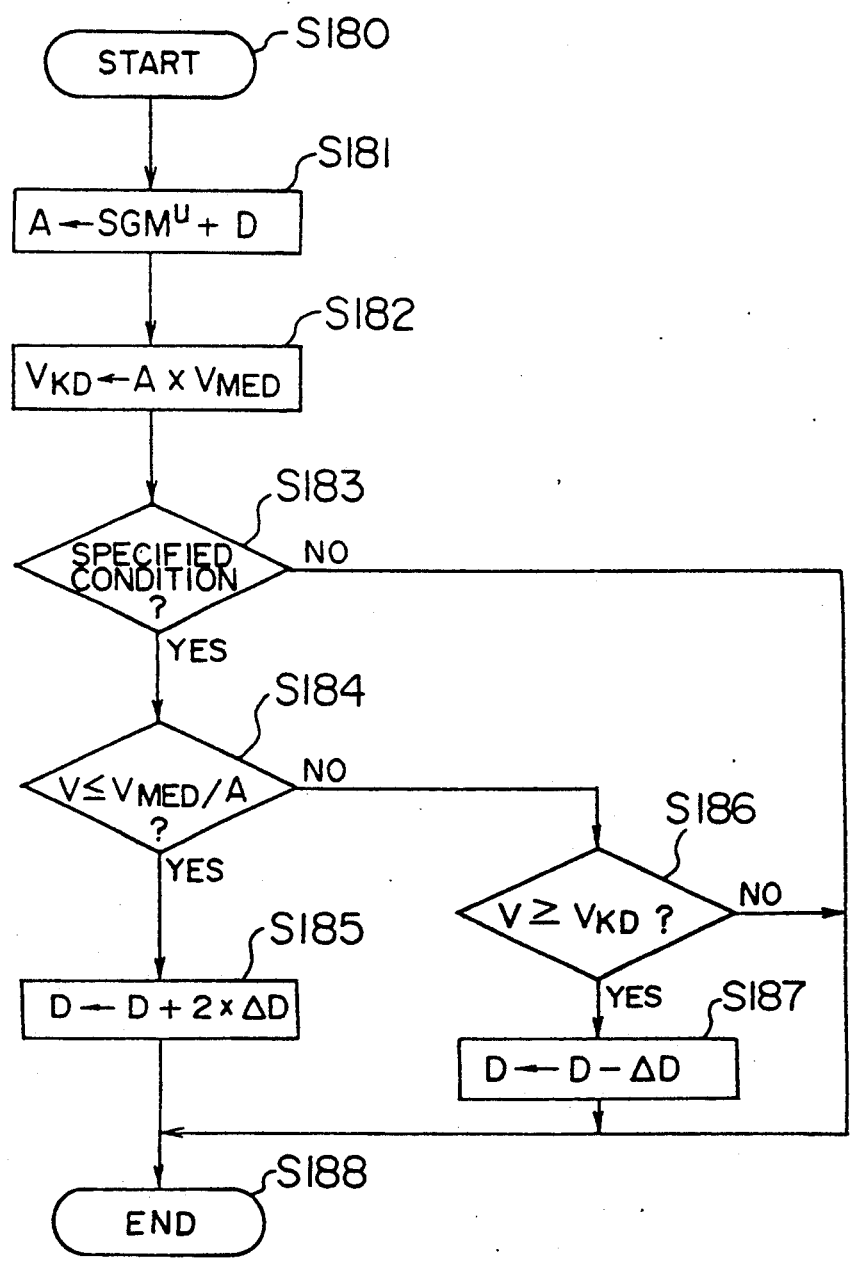

The concept of u can be applied to the art disclosed by JP-A-60-243369. This will be explained by making reference to a flow chart in FIG. 23.

This routine starts from step S180. In step S181, a variable A is calculated from $A = SGM^u + D$, where D is a variable determined by the distribution pattern of output signals of a knock sensor. In step S182, a knock decision level $V_{KD}$ is set to a value obtained by the multiplication of a median value $V_{MED}$ by the value of the variable A calculated in step S181. In step S183, a decision is made as to whether an operating condition of the engine or a knock sensor signal satisfies a specified condition. The processing proceeds to step S184, if the result of S183 is YES, while, to step S188, if it is NO. This specified condition includes, for example:

(i) an engine load is equal to or larger than a predetermined value;

(ii) an engine speed is within a predetermined range;

(iii) the change rate of the engine speed is equal to or smaller than a predetermined value; and (iv) the value of $V_{MED}$ is within a predetermined range.

In step S184, a decision is made as to whether $V \leq V_{MED}/A$ is satisfied. The processing proceeds to step S185, if the result of step S184 is YES, while, to step S186, if it is NO. In step S185, D is increased by $2 \times \Delta D$. In step S186, a decision is made as to whether $V \geq V_{KD}$ is satisfied. The processing proceeds to step S187, if the result of step S186 is YES, while, to step S188, if it is NO. In step S187, D is decreased by $\Delta D$. In step S188, this routine ends. Here, D is not restricted to have a positive value, but it may have a negative value. Thus, the variable D is corrected to be decreased in case of a large knock condition, that is, when the frequency of occurrence of the region 4 in FIG. 15 is large, while, it is corrected to be increased in case of a small knock condition, that is, when the frequency of occurrence of the region in FIG. 15 is large.

By virtue of the above-described processings, when the median value $V_{MED}$ deviates from a true value at the time of transition, etc., the standard deviation SGM is changed to compensate the deviation. Therefore, an accurate knock decision is made possible even at the time of transition.

Figure 24A:
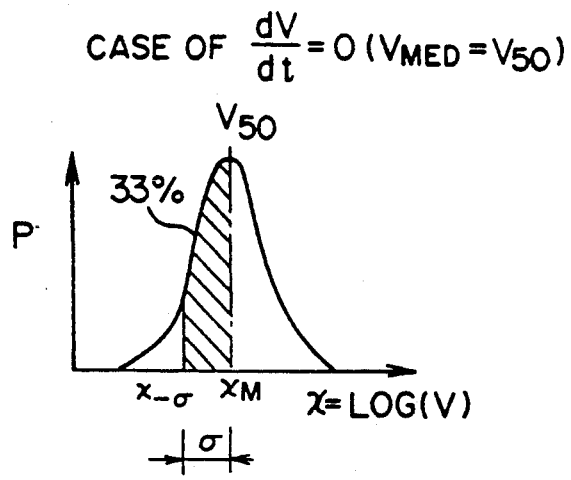
Figure 24B:
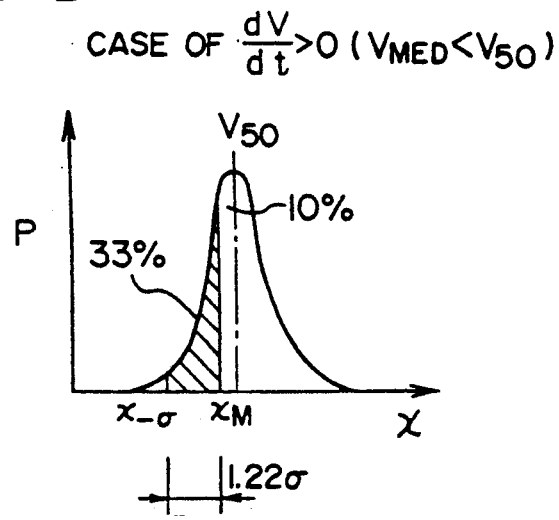
Figure 24C:
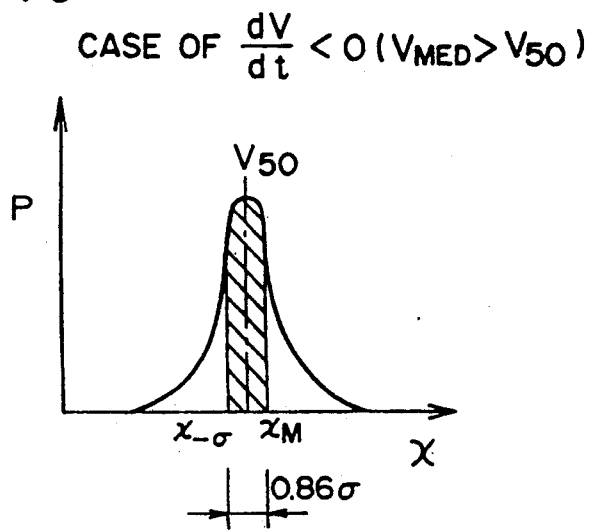

In the following, a supplementary explanation will be made of the above-described effect by making reference to FIGS. 24A to 24C. Under the condition of $dV/dt > 0$ at the time of acceleration, etc., $V_{MED}$ becomes smaller than a true value, as shown in FIG. 24B. (In a normal operating state, $V_{MED}$ coincides with the true value, as shown in FIG. 24A.) For example, assuming that $V_{MED}$ is positioned at a cumulative percentage point of 40%, then $$\int_{V_{MED}}^{V_{50}} P(v) \, dV = 10\%$$

(where $V_{50}$ denotes the true value of median value $V_{MED}$) results. Therefore, in order to satisfy the equation $$\int_{\frac{V_{MED}}{SGM}}^{V_{MED}} P(V) \, dV = 33\%$$

it is necessary that the equation $$V_{\frac{MED}{SGM}} P(V) \, dV = 7\%$$

holds. As a result, SGM is corrected to make the value of $V_{MED/SGM}$ converge to a value corresponding to a cumulative percentage point of 7%.

The cumulative percentage points of 40% and 7% respectively correspond to a point of $-0.25\sigma$ and a point of $-1.47\sigma$ (which are obtained from the normal distribution table). Accordingly, it results that SGM is corrected toward a value corresponding to a point of $[-0.25 - (-1.47)]\sigma = 1.22\sigma$ in the frequency distribution of peak values, and it takes a value larger than the true value. Therefore, an erroneous knock decision can be prevented in accordance with the compensation of a deviation of $V_{MED}$ from the true value by the correction of SGM. On the other hand, under the condition of $dV/dt < 0$ at the time of deceleration, etc., $V_{MED}$ has a value larger than the true value, as shown in FIG. 24C. For example, assuming that $V_{MED}$ is positioned at a cumulative percentage point of 60%, a similar technical concept is also applicable here, and SGM is corrected to make $V_{MED/SGM}$ converge to a cumulative percentage point of 27 ($= 60 - 33$)%. Since the cumulative percentage points of 60% and 27% correspond to points of $-0.25\sigma$ and $-0.61\sigma$, respectively, it results that SGM is corrected toward a value corresponding to 0.86 ($= 0.25 + 0.61$)$\sigma$, and hence, it takes a value smaller than the true value, thereby compensating the deviation of $V_{MED}$ from the true value.

As has been explained above in detail, the present invention provides the following excellent effects.

1. Since a knock decision level is set in accordance with a cumulative percentage point and a standard deviation in the frequency distribution of representative values and the state of an engine, the knock decision level is not effected by a change of the frequency distribution due to variations in the engine, cylinders, knock sensors, etc. As a result, it is possible to make an accurate knock decision.

2. Since the cumulative percentage point and the standard deviation are detected at every cycle, it is possible to set a suitable knock decision level rapidly.

3. Since the knock decision level is set so that the knock decision frequency becomes constant when no knock is generated, it is possible to control ignition timing so that it is advanced always at a constant rate.

We claim:

1. A knock generation control system for an engine comprising:

a knock sensor for detecting a knocking phenomenon generated in an engine;

representative value detecting means for detecting representative values V from output signals of said knock sensor, said output signals being effective for detecting a knock;

standard deviation detecting means for detecting a quantity SGM corresponding to a standard deviation of a frequency distribution of logarithmic conversion values $lV$ of said representative values V;

cumulative percentage point detecting means for detecting a value $V_p$ of a cumulative percentage point of said frequency distribution;

knock decision level setting means including U value calculating means for calculating a value U which becomes greater as a rotational speed of the engine increases and for setting a knock decision level $V_{KD}$ in accordance with said quantity SGM corresponding to the standard deviation said value $V_p$ of said cumulative percentage point and said value U;

knock detecting means for detecting generation of a knock in accordance with said representative values V and said knock decision level $V_{KD}$ and producing a knock generation detection signal; and adjusting means representative to said knock generation detection signal from said knock detecting means for adjusting a knock control factor which is used to suppress the generation of a knock.

2. A knock generation control system for engines according to claim 1, wherein said standard deviation detecting means further comprises logarithmic conversion means for forming said logarithmic conversion values IV of said representative values V in accordance with the relation $$IV = A \times \log(V/a) \quad (A, a: \text{constants}).$$

3. A knock generation control system for engines according to claim 2 wherein said logarithmic conversion means comprises:

storing means for preliminarily storing said logarithmic conversion values therein; and reading means for reading said logarithmic conversion values corresponding to said representative values V from said storing means.

4. A knock generation control system for engines according to claim 2, wherein said knock decision level setting means sets said knock decision level $V_{KD}$ in accordance with said quantity SGM corresponding to the standard deviation and said value $V_P$ of the cumulative percentage point by the use of the relation $$V_{KD} = u \times SGM + V_P.$$

5. A knock generation control system for engines according to claim 1, wherein said cumulative percentage point detecting means comprises:

speed detecting means for detecting a rotational speed of said engine;

speed logarithmic conversion means for logarithmically converting the rotational speed of said engine detected by said speed detecting means; and cumulative percentage point correcting means for correcting said value $V_p$ of the cumulative percentage point in accordance with a logarithmically converted engine speed.

6. A knock generation control system for engines according to claim 1, wherein said standard deviation detecting means comprises first detecting means for detecting that said engine is in a state in which a knock is easily generated, whereby said standard deviation detecting means, performs detection of said quantity SGM corresponding to the standard deviation only when said first detecting means detects that said engine is in the state in which a knock is easily generated.

7. A knock generation control system for engines according to claim 1, wherein said standard deviation detecting means comprises:

second detecting means for detecting that said engine is in a state in which a knock is hard to be generated;

upper limit value setting means for detecting a quantity SGM corresponding to a standard deviation, under the condition that said second detecting means has detected that said engine is in the state in which a knock is hard to be generated, and setting the detected quantity SGM corresponding to the standard deviation as an upper limit value for the standard deviation; and suppressing means for suppressing said upper limit value in accordance with said quantity SGM corresponding to the standard deviation.

8. A knock generation control system for engines according to claim 1, wherein said adjusting means comprises:

knock intensity decision level setting means for setting a knock intensity decision level $V_{KD'2}$ higher than said knock decision level $V_{KD}$ in accordance with said quantity SGM corresponding to the standard deviation and said value $V_p$ of the cumulative percentage point; and adjustment quantity setting means for setting an adjustment quantity for adjusting said knock control factor in accordance with said representative values V and said knock intensity decision level $V_{KD'2}$.

9. A knock generation control system for engines according to claim 1, wherein said value $V_p$ of the cumulative percentage point is set to a cumulative percentage point of 50% (a median value) $V_{MED}$.

10. A knock generation control system for engines according to any one of claims 2 or 3, wherein said standard deviation detecting means comprises change means for changing said quantity SGM corresponding to the standard deviation so as to satisfy at least one of a condition that a probability of satisfying the relation $(V_p - SGM) \leq IV \leq V_p$ becomes $\frac{1}{3}$ and a condition that a probability of satisfying the relation $(V_p - SGM) \leq IV \leq (V_p + SGM)$ becomes $\frac{2}{3}$, respectively, with respect to said logarithmic conversion values IV of said representative values V and said value $V_P$ of the cumulative percentage point.

11. A knock generation control system for engines comprising:

speed detecting mans for detecting a rotational speed of an engine;

a knock sensor for detecting a knocking phenomenon generated in said engine;

representative value detecting means for detecting representative values from output signals of said knock sensor which are effective for the detection of a knock;

standard deviation detecting means for detecting a quantity corresponding to a standard deviation in a frequency distribution of logarithmic conversion values of said representative values;

cumulative percentage point detecting means for detecting a value of a cumulative percentage point in said frequency distribution;

knock decision level setting means for setting a knock decision level in accordance with the detected rotational speed of said engine, said quantity corresponding to the standard deviation and a quantity corresponding to said cumulative percentage point so that the frequency of knock decision per unit time takes a predetermined value;

knock detecting means for detecting generation of a knock in accordance with said representative values and said knock decision level and producing a detection signal; and adjusting means responsive to said detection signal from said knock detecting means for adjusting a knock control factor so as to suppress the generation of a knock.

* * * * *